US009128840B2

(12) United States Patent
May

(10) Patent No.: US 9,128,840 B2
(45) Date of Patent: Sep. 8, 2015

(54) METHODS FOR PROVIDING FOR CORRECTING DATA AND ASSOCIATED APPARATUS

(75) Inventor: Jules May, Angus (GB)

(73) Assignee: Senergy Technology Limited, Aberdeen (GB)

(*) Notice: Subject to any disclaimer, the term of this patent is extended or adjusted under 35 U.S.C. 154(b) by 168 days.

(21) Appl. No.: 13/877,277

(22) PCT Filed: Sep. 26, 2011

(86) PCT No.: PCT/GB2011/001388
§ 371 (c)(1),
(2), (4) Date: May 16, 2013

(87) PCT Pub. No.: WO2012/042195
PCT Pub. Date: Apr. 5, 2012

(65) Prior Publication Data
US 2013/0326301 A1    Dec. 5, 2013

(30) Foreign Application Priority Data

Oct. 1, 2010 (GB) .................................. 1016556.1

(51) Int. Cl.
*G06F 11/07* (2006.01)
*G01V 3/38* (2006.01)

(52) U.S. Cl.
CPC .............. *G06F 11/0793* (2013.01); *G01V 3/38* (2013.01)

(58) Field of Classification Search
CPC ....... G01V 1/48; G01V 3/08; G01V 2210/54; G01V 3/38; G01V 3/10; G06F 11/0703; G06F 11/0793; G06F 11/002
See application file for complete search history.

(56) References Cited

U.S. PATENT DOCUMENTS

| | | | | |
|---|---|---|---|---|
| 3,496,459 | A * | 2/1970 | Foner | 324/233 |
| 4,677,596 | A * | 6/1987 | Lyle et al. | 367/46 |
| 4,757,262 | A * | 7/1988 | Bostick, Jr. | 324/350 |
| 5,012,193 | A * | 4/1991 | Chen | 324/366 |
| 5,107,841 | A | 4/1992 | Sturgill | |
| 5,159,577 | A * | 10/1992 | Twist | 367/25 |
| 5,210,691 | A | 5/1993 | Freedman et al. | |
| 5,247,302 | A | 9/1993 | Hughes | |
| 6,184,682 | B1 | 2/2001 | Ehman et al. | |
| 6,253,155 | B1 * | 6/2001 | Hagiwara | 702/9 |
| 7,288,932 | B2 * | 10/2007 | Dufour et al. | 324/207.12 |

(Continued)

OTHER PUBLICATIONS

International Search Report PCT/ISA/210 for International Application No. PCT/GB2011/001388 dated on Dec. 30, 2011.

(Continued)

*Primary Examiner* — Cynthia Britt
(74) *Attorney, Agent, or Firm* — Harness, Dickey & Pierce

(57) ABSTRACT

The apparatus and methods allow for correcting data from a sensor due to changes in relative speed of that sensor. The methods and apparatus described use a determined entropy from data associated with across a direction of travel of the sensor together with a determined entropy from data associated with in a direction of travel of the sensor. The determined entropies allow for providing for correcting the data for changes in the relative speed of the sensor. Also, described are methods and apparatus for correcting data from at least first and second sensors of a measurement device, whereby features are correlated from datasets taken from both sensors to determine one or more corresponding signatures. These signatures can then be used to correct the data from first and second sensors.

18 Claims, 22 Drawing Sheets

(56) References Cited

U.S. PATENT DOCUMENTS

| | | | |
|---|---|---|---|
| 7,391,217 B2* | 6/2008 | Linse et al. | 324/326 |
| 7,701,221 B2* | 4/2010 | Kolatschek | 324/329 |
| 2003/0080728 A1* | 5/2003 | Daalmans et al. | 324/164 |
| 2004/0000903 A1* | 1/2004 | Morimoto | 324/207.12 |
| 2004/0083804 A1* | 5/2004 | Maute | 73/152.29 |
| 2009/0210157 A1* | 8/2009 | Lee | 701/301 |
| 2010/0250214 A1* | 9/2010 | Prioul et al. | 703/10 |
| 2011/0254565 A1* | 10/2011 | De Boer et al. | 324/601 |

OTHER PUBLICATIONS

Written Opion PCT/ISA/237 for International Application No. PCT/GB2011/001388 dated Dec. 30, 2011.

* cited by examiner

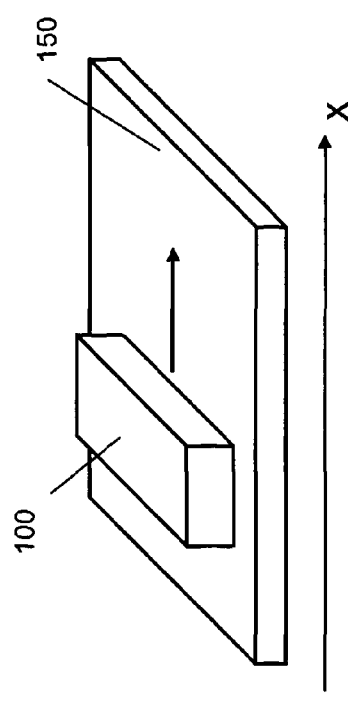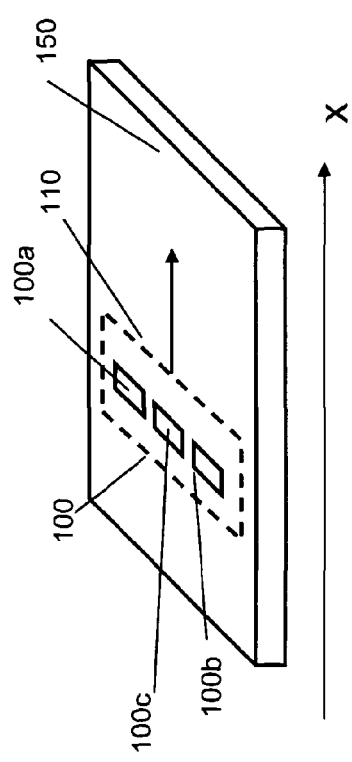

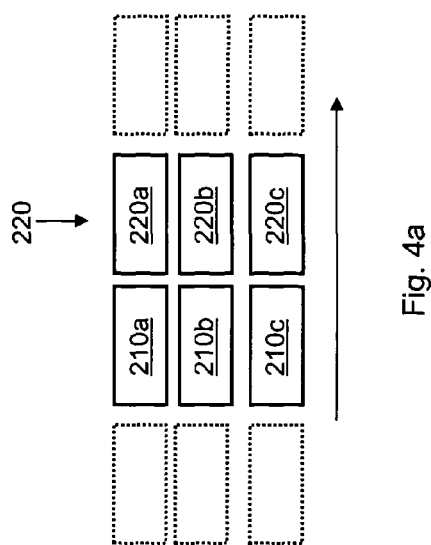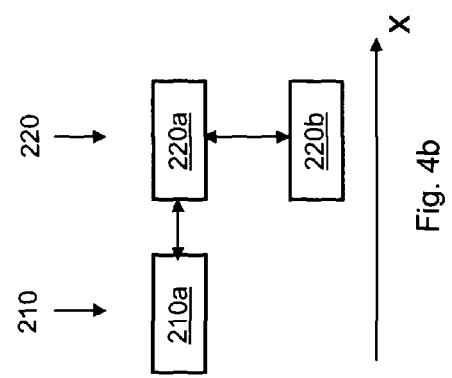

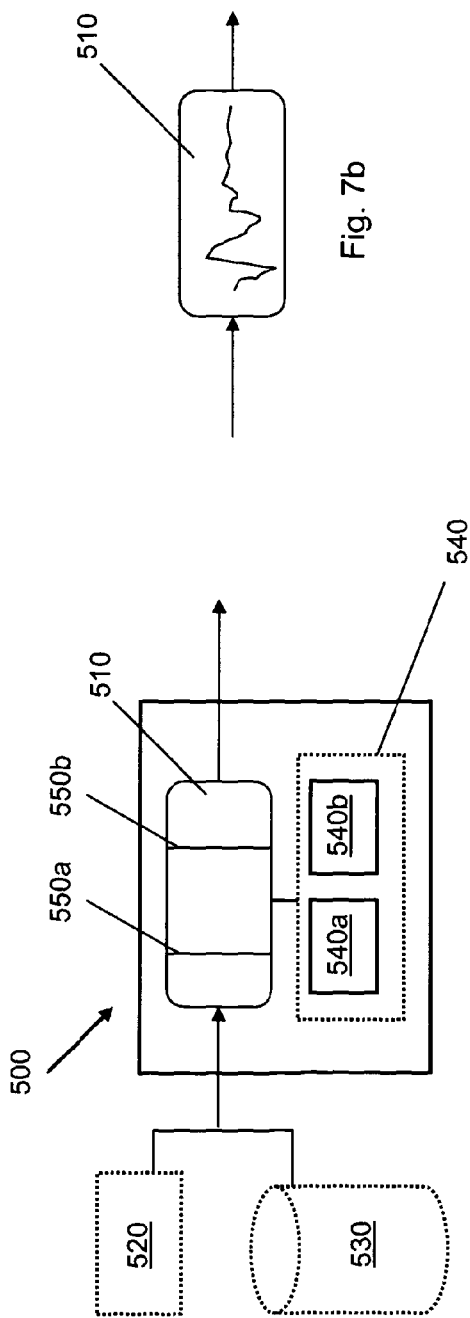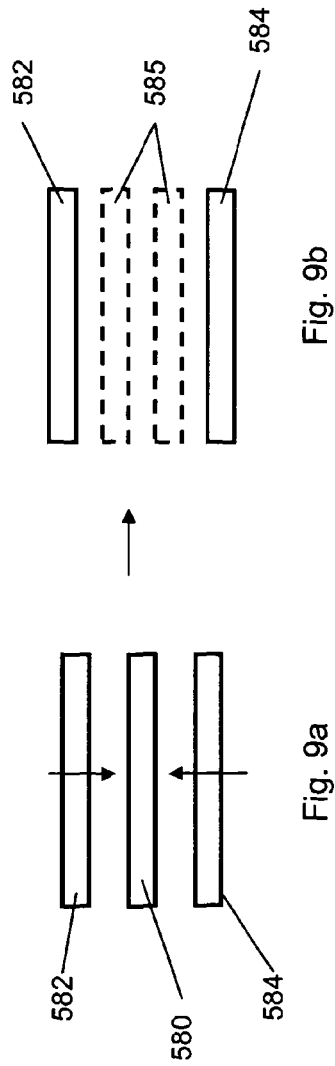

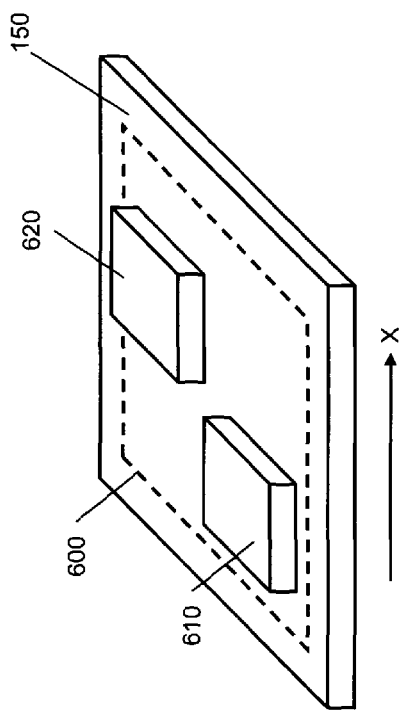
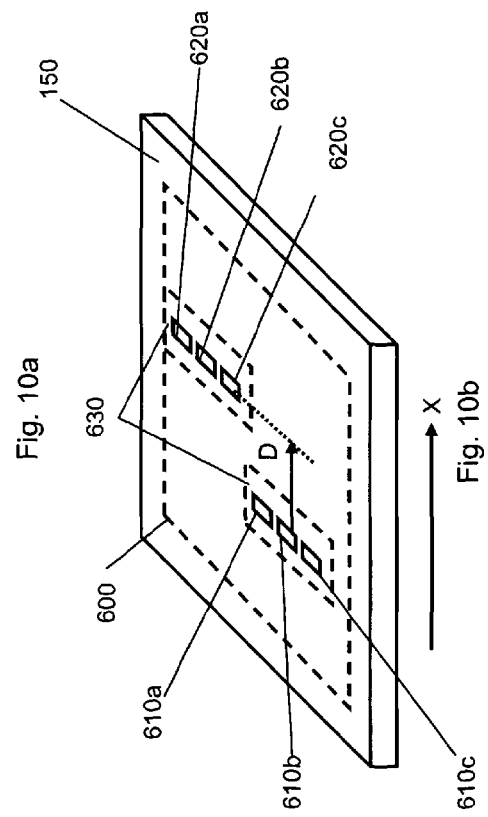

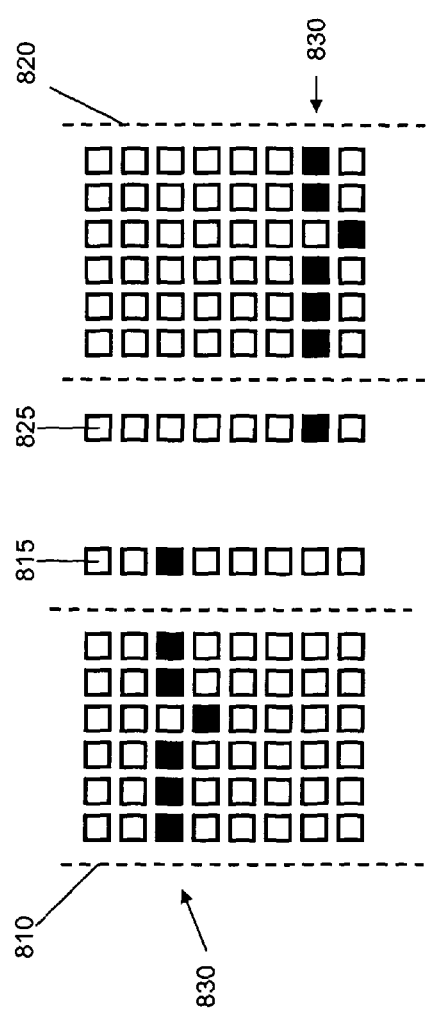
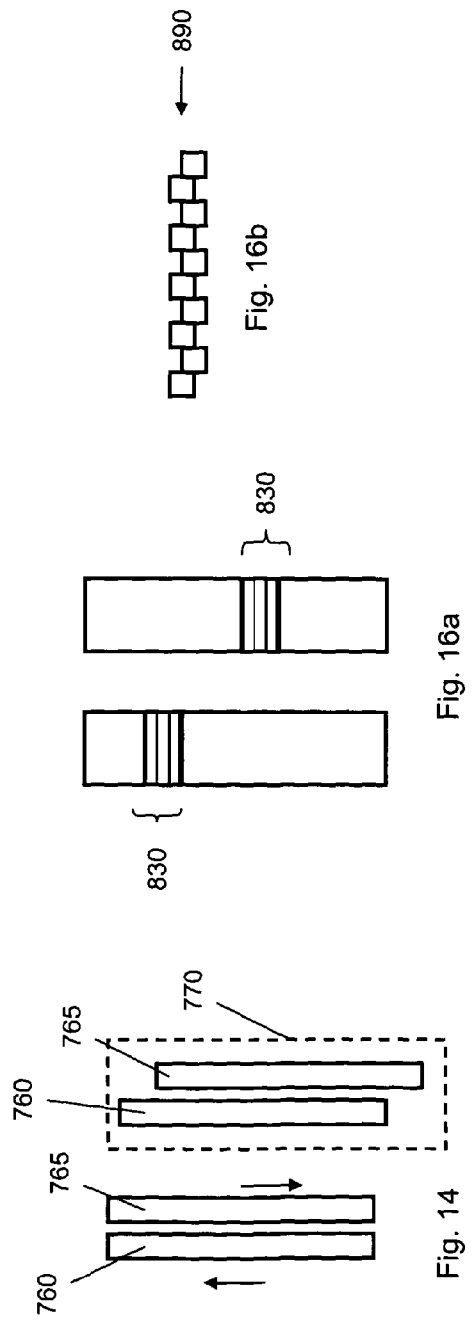

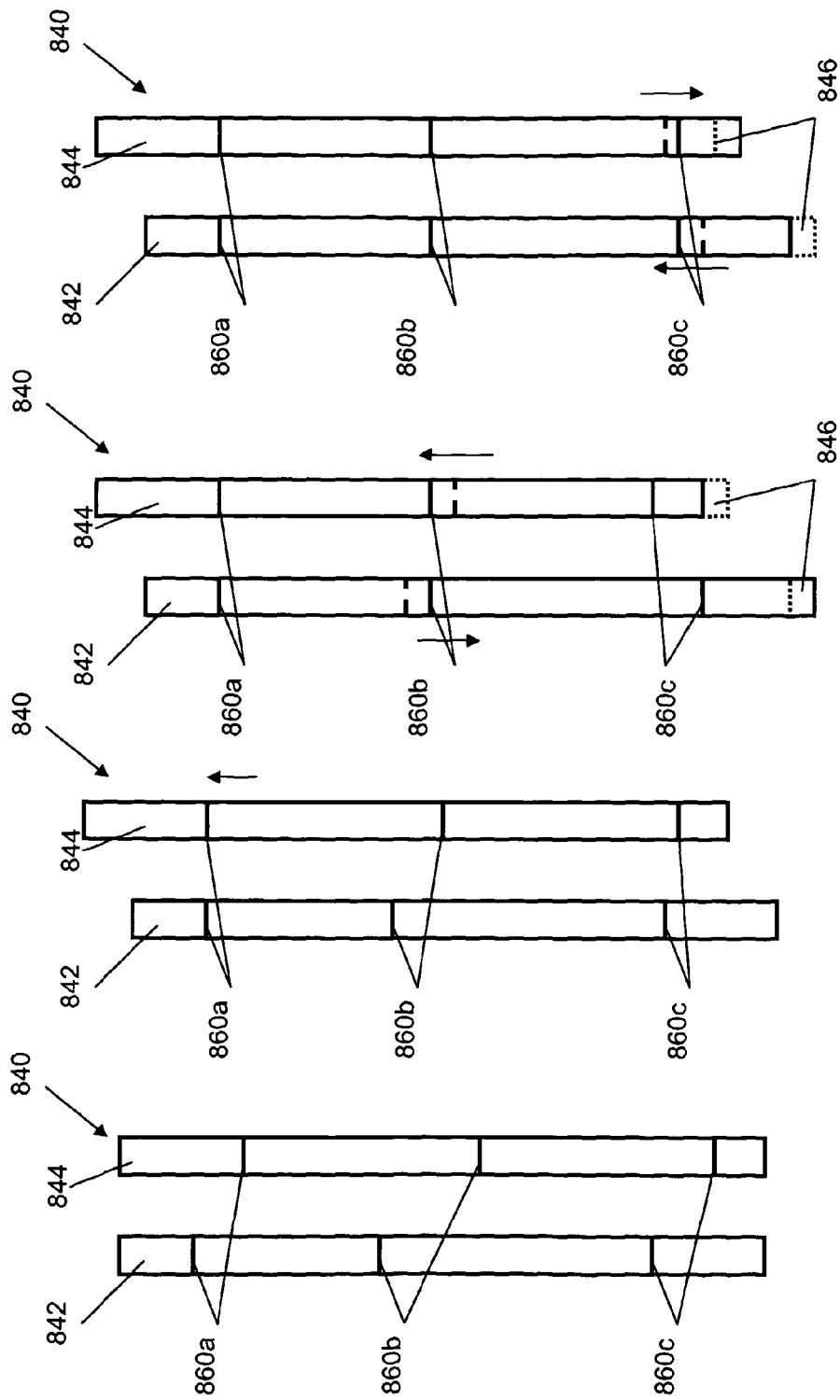

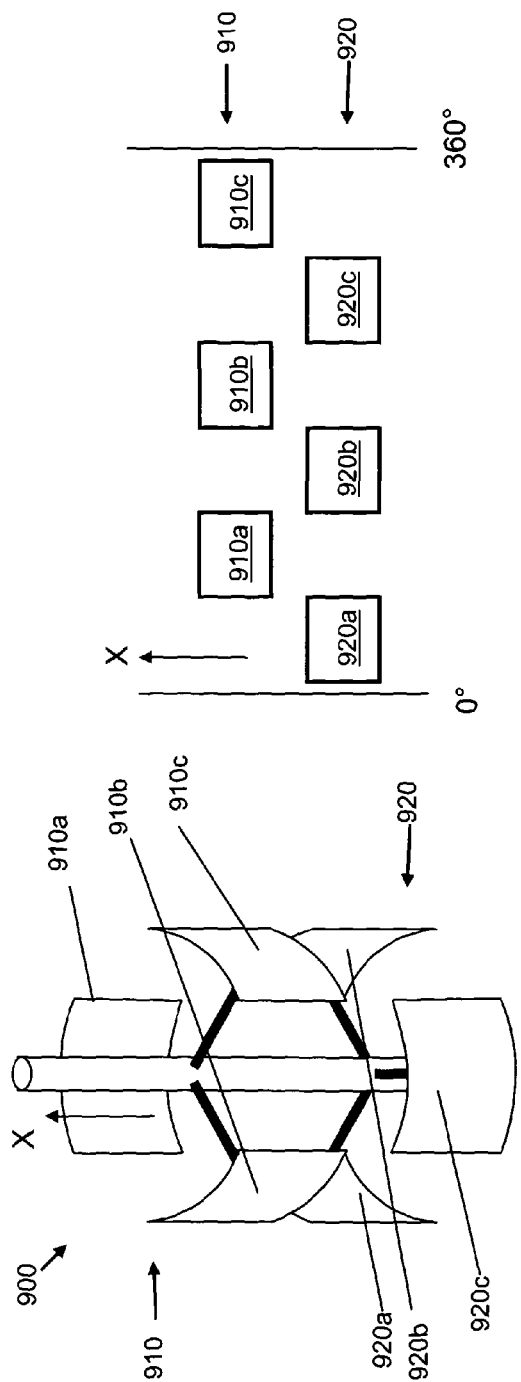
Fig. 18b
Fig. 20
Fig. 18a
Fig. 19

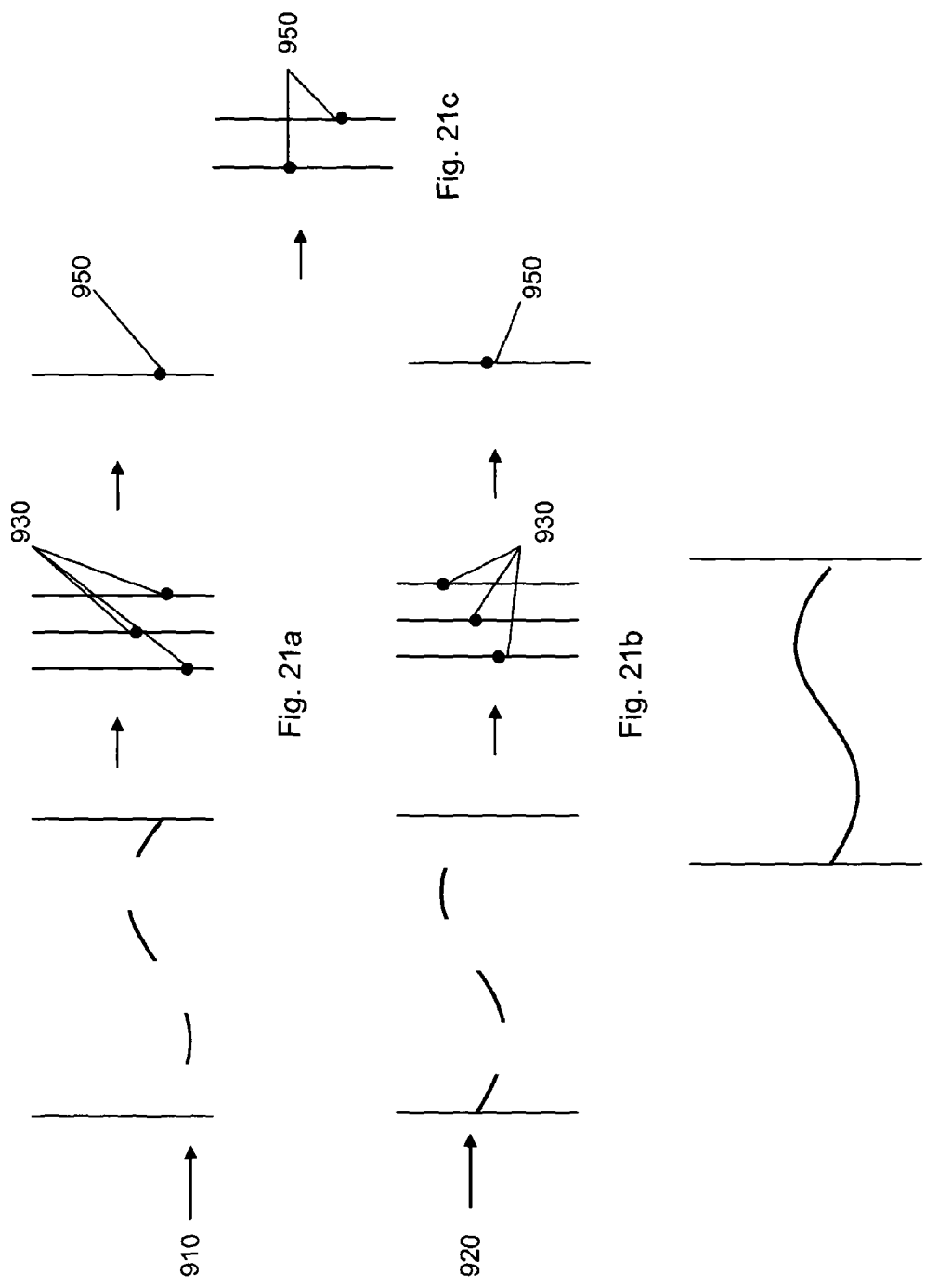

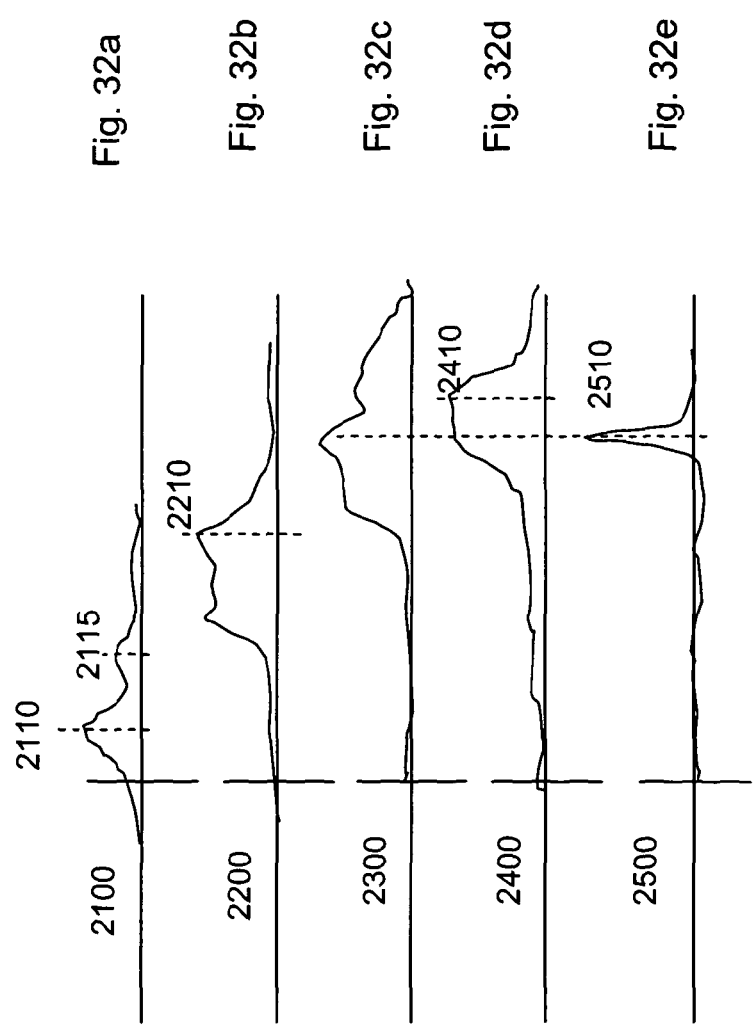

METHODS FOR PROVIDING FOR CORRECTING DATA AND ASSOCIATED APPARATUS

TECHNICAL FIELD

The invention relates to the field of providing for correcting data, such as data derived from a sensor measuring a material, and associated apparatus. In particular, but not exclusively, the invention relates to the field of providing for correcting data derived from a sensor and/or measurement device having been moved with respect to material.

Certain embodiments of the invention relate to a method of providing for correcting data derived from a logging tool, such as that used in the oil and gas industry. The data may be raw data (i.e. that derived directly from the tool), or may be previously corrected, or modified, data.

BACKGROUND

In certain industries it is valuable to characterise particular materials. To do so, sensors can be configured to move with respect to a particular material and signals passed into or through the material. In some cases, the sensors may be moved while the material remains stationary, while in other cases the material may be moved and the sensors remain stationary. In some cases, the sensors may be mechanically touching the material, in other cases, they may not (e.g. acoustic, optical sensors, or the like).

The data output of such sensors is usable to provide a characteristic of the material being measured. This measured characteristic may provide a characteristic image or map of the material itself, or may be useable to reconstruct further data or information encoded with or within the material. The measured characteristic may be representative of the body of the material, and/or the surface or surface region of the material.

Examples of such moving sensors include a tape head usable with magnetic tape, whereby the tape is moved with respect to a stationary, or relatively stationary, tape head, such that the characteristic magnetism of the tape can be measured. This characteristic can then be used to reconstruct audio, video or data. A further example is an image scanner, or facsimile machine. Again the material (i.e. paper, or the like) is moved relative to an optical sensor. The data output of the sensor is usable to provide an image of the paper, or indeed, what is composed on the paper.

By maintaining the relative speed of such sensors to be constant or at least roughly constant, samples can be taken at particular intervals, such as regular intervals, along the material. These samples can then be used to provide a characteristic of the material.

However, because such sensors are being moved (and/or the material is being moved) certain variations in relative speed can arise. In the examples described above, motors used to wind or pull magnetic tape may have an eccentric motion causing a resultant variation in acoustic frequency (i.e. flutter, etc.) when the signal is reconstructed into an audio characteristic. Similarly, the tape itself may have been pulled or stretched, causing an apparent change in speed having the same effect on a reconstructed audio characteristic. In the case of a scanner, paper may jam, or be pulled awkwardly through a machine, resulting in the commonly-seen elongating or contracting of images when data is reconstructed into a copy of images provided on paper.

To compensate for these variations in relative speed, sensors may be used that mechanically interact with the material being characterised. As a result, variations in speed may be caused due to the sensor temporarily sticking or jamming on the material (e.g. as a result of frictional effects). The release of this sticking or jamming may result in a "ping back" effect, whereby the sensor or material accelerates for a time in the other, or opposite, direction. Other effects, such as the variations in roughness or friction of a surface, etc. may also cause variations in speed.

As a result of sensors experiencing these speed variations (e.g. either because the movement of material/sensor cannot be sufficiently controlled or because of sticking/jamming), it can be difficult to provide accurate data derived from such sensors.

An example of an industry that attempts to provide characteristic maps of a material using relatively moving sensors is the oil and gas industry. One such process that uses such techniques is referred to as logging, where boreholes drilled into the ground are characterised by pulling a measurement module, or so-called logging tool, through those holes. In such cases, it can be valuable to measure precisely the characteristics, or formation, of subterranean material through which a borehole passes. This information might be useful when exploring for oil and gas. For example, it can be useful to determine precisely the formation and location of particular strata formations from pilot boreholes: those used to determine the possible location of one or more hydrocarbon reservoirs. By identifying accurately the locations and presence of particular strata, the location of reservoirs can be suggested.

Such logging tools generally comprise a plurality of sensors. Some of these sensors may, in some cases, be displaced in the direction of travel from each other (e.g. the sensors may be configured in rows). As these logging tools are pulled through a borehole, the sensors are configured to touch, or at least communicate with, the wall of the borehole and characterise the associated subterranean material. However, regardless of how carefully the logging tools are pulled, variations in the speed of the tools occur. In addition, each sensor can experience localised variation due to frictional or so-called rumble effects, or the like.

Accelerometers comprised with sensors/tools have been used in order to correct data derived from tools experiencing a deviation in speed that occurred as the logging tool was being drawn through a borehole. However, there are several problems associated with using such accelerometers, which means that the quality of the results is severely limited. Firstly, due to the high forces involved, two or more different accelerometers are needed for each sensor or in order to cover the range of motion (i.e. high and low acceleration). The nature of the mathematical transformations involved when using accelerometers is approximate. Furthermore, the accelerometers can be difficult to calibrate, and in addition, are rarely calibrated when used in real life. Also, due to the harsh environments, the devices are often damaged due to being dropped or knocked, etc.

Correction for speed deviations of sensors/tools based on accelerometer data, or so-called kinematic correction, is not entirely satisfactory. As the resolving power of sensors, such as those provided with logging tools, increases the deficiencies of existing kinematic correction techniques are becoming more noticeable, and thus the information which can be inferred from such data is limited.

This background serves to set a scene to allow a skilled reader to better appreciate the following description. Therefore, none of the above discussion should necessarily be taken as an acknowledgement that that discussion is part of the state of the art or is common general knowledge. One or more aspects/embodiments of the invention may or may not address one or more of the background issues.

SUMMARY

According to a first aspect of the invention there is a method for providing for correcting data from a sensor for changes in relative speed of the sensor when being moved with respect to a material being measured, the method comprising:

using a determined entropy from data associated with across a direction of travel of a sensor together with a determined entropy from data associated with in a direction of travel of a sensor, the determined entropies allowing for providing for correcting the data for changes in the relative speed of the sensor.

The method may comprise comparing the determined entropies. The method may comprise comparing the variation in determined entropies (e.g. from one sample or time period to a subsequent sample or time interval). The method may comprise determining a variation in speed of the sensor when the determined entropy, or the variation entropies, is compared to be different.

The method may comprise determining the entropy from data associated with across a direction of travel of a sensor. The method may comprise using data provided from two or more sensor elements of the sensor, the two or more sensor elements being configured across a direction of travel in order to determine the entropy from data associated with across a direction of travel. The method may use data provided from some or all sensor elements across a direction of travel (e.g. sensor elements provided in a row). The method may comprise determining the entropy of data from each adjacent sensor element (e.g. using the RMS difference between data). The method may comprise integrating, or averaging, the determined entropy from some or all sensor elements across the direction of travel in order to provide the entropy from data associated with across a direction of travel.

The method may comprise determining the entropy from data associated with in the direction of travel of a sensor. The method may comprise using data provided from two or more sensor elements of the sensor, the two or more sensor element being configured in the direction of travel. The method may comprise using data provided from a particular sensor element with data from the same sensor element, but at a different sample, or time, interval in order to determine the entropy in the direction of travel (e.g. using the RMS difference between data). The data from such sensor elements may be considered to be data from a corresponding sensor element. The method may comprise using data from two or more (e.g. some or all) sensor elements of a sensor. The method may comprise using data from a plurality of corresponding sensor elements of the sensor. The method may comprise integrating, or averaging, the determined entropy from some or all corresponding sensor elements in the direction of travel in order to provide the entropy from data associated with in the direction of travel.

Data from sensor elements may be usable to reconstruct an image. Data from sensor elements may be usable to reconstruct a pixel for an image.

The method may comprise using the determined entropy from data associated with across a direction of travel of a sensor together with a determined entropy from data associated with in a direction a travel of a sensor in order to provide a determined anisotropy. The determined anisotropy may be used to allow for providing for correcting the data for changes in the relative speed of the sensor.

The anisotropy may be provided by determining, or comparing, a difference in entropy, whereby a variation in anisotropy may be indicative of a variation in speed of the sensor. The magnitude of the variation of speed may be indicative of the amount of variation in anisotropy.

A positive variation in anisotropy may be associated with a relative increase in entropy of the data associated with the direction of travel, with respect to the entropy of data associated with across the direction of travel. A negative variation in anisotropy may be associated with a relative decrease in entropy of the data associated with the direction of travel, with respect to the entropy of data associated with across the direction of travel. A positive variation in anisotropy may be considered to be associated with an increase in speed, while a negative variation in anisotropy may be associated with a decrease in speed.

The method may comprise correcting the data for changes in the relative speed of the sensor by using determined entropies, or the determined anisotropy. The method may comprise morphing the data in order to correct for speed variation (e.g. eliminating, combining, interpolating, adding data, etc.).

The method may comprise allowing for correcting the data for an increase and corresponding decrease in speed variation of the sensor (e.g. correcting for oscillatory speed variations). The method may allow for such correcting to occur at the same, or similar time (e.g. correcting both the increase at the decrease in speed together). The method may comprise determining corresponding positive and negative anisotropy (e.g. variations in anisotropy) in order to correct for the corresponding increases and decreases in speed variation. The method may comprise determining corresponding positive/negative anisotropies by comparing the difference between determining positive/negative anisotropies with a particular threshold.

The method may comprise interpolating data associated with a corresponding positive anisotropy and eliminating data associated with a corresponding negative anisotropy in order to correct the data for speed variation. The method may subsequently correct some or all the data again for speed variations (e.g. in an iterative or progressive manner).

The method may comprise receiving some of the data in a buffer in order to providing for correction. The data may be received sequentially. The method may comprise varying the size of the buffer (e.g. increasing or decreasing), such as varying the buffer size based on whether corresponding positive and negative anisotropies have been determined in the buffer.

According to a second aspect of the invention there is provided apparatus for providing for correcting data from a sensor for changes in relative speed of a sensor when being moved with respect to a material being measured, the apparatus configured to use a determined entropy from data associated with across a direction of travel of a sensor together with a determined entropy from data associated with in a direction of travel of a sensor, the determined entropies allowing for providing for correcting the data for changes in the relative speed of the sensor.

The apparatus may be configured to determine respective entropies from data. The apparatus may be configured to receive data (e.g. from a data store, sensor, or the like). The apparatus may be configured to compare determined entropies in order to correct data.

The apparatus may comprise one or more buffers, the buffer configured to store data associated with a sensor. The apparatus may be configured to correct data stored in the buffers based on determined respective entropies.

The apparatus may comprise a field programmable gate array, application specific integrated circuit, or the like. The apparatus may be comprised with a sensor for measuring material. The apparatus may be configured to output corrected data. The apparatus may be configured to store corrected data (e.g. for subsequent use). The apparatus may be for use with a logging tool. The apparatus may be comprised with a logging tool.

According to a third aspect of the invention there is a method for providing for correcting data from a sensor for changes in relative speed of the sensor when being moved with respect to a material being measured, the method comprising:

using a determined noise characteristic from data associated with across a direction of travel of a sensor together with a determined noise characteristic from data associated with in a direction of travel of a sensor, the determined noise characteristics allowing for providing for correcting the data for changes in the relative speed of the sensor.

The method may comprise using determined entropy for using a determined noise characteristic.

According to a fourth aspect of the invention there is a method comprising:

using a determined entropy from data associated with across a direction of travel of a sensor together with a determined entropy from data associated with in a direction a travel of a sensor, the determined entropies allowing for providing for correcting the data for changes in the relative speed of sensor when measuring a material.

According to a fifth aspect of the invention, there is provided a method for providing for correcting data from a measurement device comprising datasets from at least first and second sensors, such sensors being offset along the intended direction of travel of the measurement device, the method comprising:

comparing determined anisotropies in a first dataset associated with the first sensor with determined anisotropies in a second dataset associated with the second sensor, each determined anisotropy being associated with a determined entropy from data associated with across a direction of travel of a respective sensor together with a determined entropy from data associated with in a direction a travel of the respective sensor; and using the compared anisotropies to allow for correcting the data from the measurement device.

The method may comprise determining the anisotropies in each dataset. The method may comprise determining the entropy from data associated with across a direction of travel of each respective sensor. The method may comprise determining the entropy from data associated with in a direction of travel of each the respective sensor. Data of a sample or time interval in each dataset associated with across a direction of travel of each respective sensor may be considered to be a row of data. Data of each row may have an associated time stamp.

The compared anisotropies may be used to allow for correcting the data for changes in the relative speed of the measurement device. The method may comprise determining a variation in speed by using a compared variation in anisotropies.

The method may comprise correcting the data in each dataset for speed variations when anisotropy, or variation of anisotropy, associated with particular rows, or samples, of data in the first and second datasets when the anisotropy, or variation in anisotropy is determined to be similar or the same at, or around, the same time.

The method may comprise determining a cumulative anisotropy value based on the determined anisotropy of data in temporally corresponding rows of each dataset. The cumulative anisotropy value may allow for determining a common variation in anisotropy at, or around, the same. The cumulative anisotropy value may be indicative of a corresponding variation in determined anisotropy (e.g. not an absolute difference). The cumulative anisotropy value may be a common mode value. The cumulative anisotropy value may use Gaussian common mode analysis of the determined anisotropies in the first and second datasets.

The method may comprise allowing for correcting the data in each dataset for an increase and corresponding decrease in speed variation of the measurement device (e.g. correcting for oscillatory speed variations apparent in each dataset), such as allowing for correcting for corresponding increase and decrease at the same, or similar time.

The method may comprise using the determined cumulative anisotropy value to determine corresponding positive and negative anisotropies in each dataset (e.g. corresponding positive negative variations in anisotropy at, or around, the same time in each dataset).

The method may comprise interpolating data in each dataset associated with a corresponding positive anisotropy and eliminating data in each dataset associated with a corresponding negative anisotropy in order to correct the data for speed variation. The method may subsequently correct some or all the data in each dataset again for speed variations (e.g. in an iterative or progressive manner).

The compared anisotropies may be used to allow for correcting the data for the offset between the first and second sensor (e.g. when a variation of anisotropy associated with particular rows, or samples, in first and second datasets is determined to be similar, or the same, but at different times (e.g. offset times)).

The method may comprise using the compared anisotropies to allow for correcting the data from the measurement device, the data having been previously corrected for the offset between first and second sensor. The method may comprise determining variations in anisotropy associated with speed variations of the measurement device, and correcting the data such that corresponding variations in anisotropy occur at the same, or similar time (e.g. bring data from first and second datasets back into isochronicity).

According to a sixth aspect of the invention, there is provided apparatus for providing for correcting data from a measurement device comprising datasets from at least first and second sensors, such sensors being offset along the intended direction of travel of the measurement device, the apparatus configured to compare determined anisotropies in a first dataset associated with a first sensor with determined anisotropies in a second dataset associated with a second sensor, each determined anisotropy being associated with a determined entropy from data associated with across a direction of travel of a respective sensor together with a determined entropy from data associated with in a direction a travel of the respective sensor; the apparatus further configured to use the compared anisotropies to allow for correcting data from a measurement device.

According to a seventh aspect of the invention, there is provided a method comprising:

comparing determined anisotropies in a first dataset associated with a first sensor with determined anisotropies in a second dataset associated with a second sensor, each determined anisotropy being associated with a determined entropy from data associated with across a direction of travel of a respective sensor together with a determined entropy from data associated with in a direction a travel of the respective sensor, each sensor being offset in a direction of travel of a measurement device comprising the sensors; and using the compared anisotropies to allow for correcting the data from the measurement device.

According to an eighth aspect of the invention, there is provided a method for providing for correcting data from at least first and second sensors of a measurement device, the sensors being offset along the intended direction of travel of the measurement device, the method comprising:

determining features in a dataset from the first sensor, such features associated with an artefact in material being measured;

determining features in a dataset from the second sensor; and correlating the features from both datasets to determining one or more corresponding signatures in the datasets, and using the corresponding signature(s) to correct the data from first and second sensors.

The features may be determined from bandings or artefacts in the material. The features may be determining as data integrals associated with the data set, each data integral corresponding to an integral of the data provided across one or more rows of a particular dataset, and wherein each row comprising data usable to provide a plurality of pixels in a row. The method may comprise first determining pad data integrals associated with two or more sub datasets of each sensor, and subsequently determining core data integrals from respective pad data integrals, whereby the method comprising correlating the core data integrals in order to determine one or more corresponding signatures.

The features may be associated with determined anisotropies of the datasets, each determined anisotropy being associated with a determined entropy from data associated with across a direction of travel of a respective sensor together with a determined entropy from data associated with in a direction a travel of the respective sensor.

The method may comprise correlating the features using Fourier correlation. The features may be 2D features. The method may comprise correlating the features using 2D Fourier correlation. The method may comprise using peak detect methods to determine signatures from correlated features.

The method may comprise using the signature to provide one or more keyframes common to both the first and second datasets. The method may comprise modifying the data between particular keyframes in order to correct the data in each datasets. Modifying may include elimination (or deletion), interpolation, addition, etc. Modifying the data may be considered to be data morphing.

According to a ninth aspect of the invention there is provided apparatus for providing for correcting data from at least first and second sensors of a measurement device, such sensors being offset along an intended direction of travel of a measurement device, the apparatus configured to determine features in a dataset from a first sensor, such features associated with an artefact in material being measured and determine features in a dataset from a second sensor; the apparatus further configured to correlate the features from both datasets to determining one or more corresponding signatures in such datasets, and use corresponding signature(s) to correct data from first and second sensors.

According to a tenth aspect of the invention, there is provided a method for providing for determining the tilt of an artefact, or striation, from data from a measurement device.

The method may comprise determining features in a dataset from a first sensor of the measurement device, such features associated with an artefact in material being measured. The method may comprise determining a one or more data integrals associated with the features. The method may comprise using the one or more data integrals in order to determine the tilt of a striation.

The method may comprise determining features in a dataset from a second sensor of the measurement device. The second sensor may be offset in the intended direction of travel from a first sensor. The method may comprise determining a one or more data integrals associated with the features. The method may comprise using the one or more data integrals in order to determine the tilt of a striation.

The method may comprise comparing a determined tilt from a first sensor, with a determined tilt from a second sensor. The compared determined tilts may be used to verify the tilt determination.

The method may comprise determining the absolute tilt of a striation by using an observed, or apparent, tilt of striation. The method may additionally use a relative orientation of a measurement device (e.g. provided from magnetometers).

According to an eleventh aspect of the invention, there is provided a method for providing for correcting data from a measurement device comprising datasets from at least first and second sensors, such sensors being offset along the intended direction of travel of the measurement device, the method comprising:

comparing determined anisotropies in a first dataset associated with the first sensor with determined anisotropies in a second dataset associated with the second sensor, each determined anisotropy being associated with a determined entropy from data associated with across a direction of travel of a respective sensor together with a determined entropy from data associated with in a direction a travel of the respective sensor;

determining features in a dataset from the first sensor, such features associated with an artefact in material being measured;

determining features in a dataset from the second sensor; and correlating the features from both datasets to determining one or more corresponding signatures in the datasets, and using the corresponding signature(s) to allow for correcting the data for the offset between first and second sensors and using the compared anisotropies to allow for correcting the data from the measurement device;

According to an twelfth aspect of the invention, there is a measurement device comprising one or more apparatus according to any of the features of the second, sixth, or ninth aspects.

The measurement device may be comprised with a logging tool.

According to a thirteenth aspect of the invention there is a computer program, provided on a computer readable medium, the computer program configured to provide the features of any of the first, third, fourth, fifth, seventh, eighth tenth, or eleventh aspects.

The present invention includes one or more corresponding aspects, embodiments or features in isolation or in various combinations whether or not specifically stated (including claimed) in that combination or in isolation. For example, certain aspects of the invention may use determined entropy, while certain aspect may use determined noise characteristics, without the need to list all various possibilities are permutations here. Corresponding means for performing one or more of the discussed functions are also within the present disclosure. It will be appreciated that one or more embodiments/aspects may be useful in correcting data derived from a relatively moving sensor, such as a logging tool.

The above summary is intended to be merely exemplary and non-limiting.

BRIEF DESCRIPTION OF THE FIGURES

A description is now given, by way of example only, with reference to the accompanying drawings, in which:—

FIG. 1 shows an example of a sensor and material;

FIG. 4 shows exemplary pixels taken from sensor elements, and a simplified method of determining or estimating anisotropy;

FIG. 7 shows an apparatus for correcting data for speed variations;

FIG. 9 shows a further method for correcting data;

FIG. 10 shows an example of a measurement device comprising first and second sensors;

FIG. 14 shows a simplified representation of correcting for offset between datasets FIG. 15 shows exemplary signatures for use as keyframes with correcting an offset;

FIG. 16a shows further exemplary signatures, and FIG. 16b shows interleaved sensor elements;

FIG. 17 shows an example of correcting datasets for an offset using keyframes;

FIG. 18 shows an example of a measurement device shown as a simplified logging tool;

FIG. 19 shows an example of a borehole and a dipping striation, or artefact;

FIG. 20 shows an example of an isochronous characteristic map of the striation of FIG. 19 using the device of FIG. 18;

FIG. 21 shows a method of determining a core data integral for use as a keyframe;

FIG. 22 shows a corrected characteristic map of FIG. 20;

FIG. 32 shows an example of correlating from three datasets.

DESCRIPTION OF SPECIFIC EMBODIMENTS

Figure 2A:
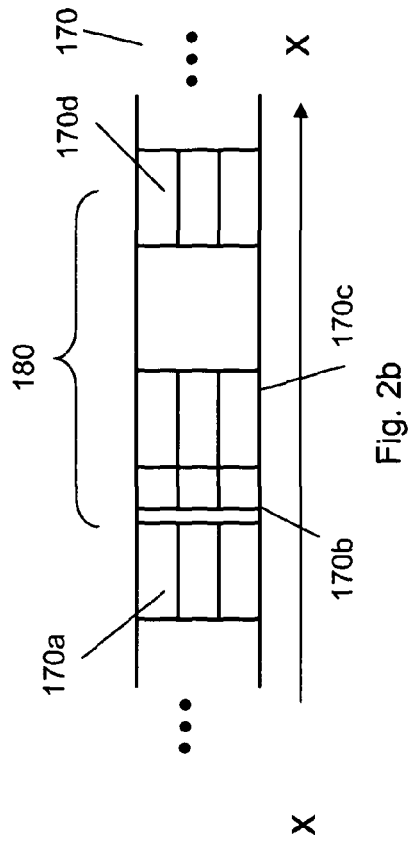
FIG. 2 shows an example of a row associated with data from sensor elements of the sensor of FIG. 1.

For ease of understanding, the following description is made with reference to a logging tool where it might be considered appropriate to do so. However, a skilled reader will appreciate that any such reference is merely exemplary only, and in no way should the following description be considered to be limited to use with such logging tools alone. Indeed, the following described methodology and/or apparatus may have applicability in a wide range of industrial applications.

FIG. 1a shows a simplified representation of a sensor 100 for characterising, or scanning, a material 150. Here, the sensor 100 is configured to be moved with respect to the material 150 in direction 'x', and to sample the material 150 at particular sample intervals. FIG. 1b shows three sensor elements 100a, 100b, 100c of the sensor 100 (i.e. without the sensor housing, or the like). In this example, the sensor elements 100a-100c are provided in a row 110, which is configured across the intended direction of travel of sensor 100/material 150. In other words, the sensor elements 100a-100c are configured such that the row 110 is roughly perpendicular, or orthogonal, to the intended direction of travel of the sensor 100 (the direction of travel being indicated by the arrow, X, in FIG. 1). The output from the sensor 100 is data from each of the sensor elements 100a-110c that is usable to provide or reconstruct a characteristic image, or map, the material 150.

As discussed above, it will be appreciated that this arrangement of sensor 100 (and sensor elements 100a-100c) and material 150 is applicable to many applications. For example, the sensor 100 may be configured to read magnetic characteristics from the material 150 (i.e. magnetic tape and reader), or may be configured to communicate an electric current, magnetic field or an acoustic emission through or at the material 150 in order to characterise the material 150. Additionally, or alternatively the sensor 100 may be configured to receive a signal, such as a characteristic radioactive emission, or the like. The sensor 100 may be configured to optically characterise the material 150, for example, by capturing a series of images associated with each sample interval. It will be appreciated that any movement may be provided by moving the sensor 100 and/or the material 150 (e.g. the sensor 100 may be moved along the material 150, or the sensor 100 may be configured to be stationary, while the material 150 is moved, such as that provided in the configuration of a facsimile machine).

However, to aid understanding, consider that the sensor 100 is configured to be moved with respect to that material 150, and configured to communicate a signal with the material 150 in a similar manner to that used with an electrical logging tool. For a logging tool, data provided from each sensor element 100a-100c is usable to provide an image pixel that is representative of the conductivity of the material 150 at that particular sample location. In other words, the data provided from each sensor element 100a-100c is associated with the conductivity measured by that sensor element 100a-100c. It will be appreciated that the conductivity of the material 150 is associated with the type, or nature, of material 150 being measured, and as such a characteristic image or map—in some cases showing various striations or artefacts in the material 150—can be provided from data derived from the row 110, or a plurality of rows (not shown here), as the sensor 100 is moved across the material 150. In other words, the data associated with the row(s) can be cumulatively provided as a characteristic image or map representative of the underlying material 150.

In this example, as the sensor 100 moves, the material 150 is sampled by the sensor elements 100a-100c at particular discrete sample intervals (e.g. time intervals). The data provided from the sensor that is associated with the same sample interval can be considered to be isochronous. In other words, isochronous data is data from the sensor that has been acquired at, or around, the same time. In some cases, the data may have an associated time stamp, or the like.

As the sensor 100 is pulled along the material 150 the data from each row of sensor elements provides a corresponding row of pixels in a resultant image. However, the data associated with each row (either in the image, or in the data), can be considered to be temporally spaced by a time interval, which in this case is a regular time interval. For example, the material 150 may be sampled every 0.1 seconds, or the like. By having knowledge of the relative speed, and the time interval spacing between samples, a user is able to combine data from each sample interval to provide the characteristic map of the material 150. In other words, by having knowledge of the speed of the sensor 100, it is possible to configure the rows (e.g. in an image) such that it is possible to determine the location, along a material, of a measured artefact. In the example of a logging tool, this may mean that it is possible to determine the precise location of a striation, or artefact, that has been observed in a borehole (e.g. determining that an observed artefact is 376.4 meters from the surface).

FIG. 2a shows simplified representation of a characteristic map, or image, 160 resulting from data provided from the sensor elements 100a-110c of the row 110 of FIG. 1, each associated with different sample intervals 160a-160d or time intervals, when the speed of the sensor 100 remains constant with respect to the material 150. For clarity, the reconstructed image 160 in FIG. 2a has been shown with a spacing 165 between rows of data from different sample intervals.

Figure 2B:
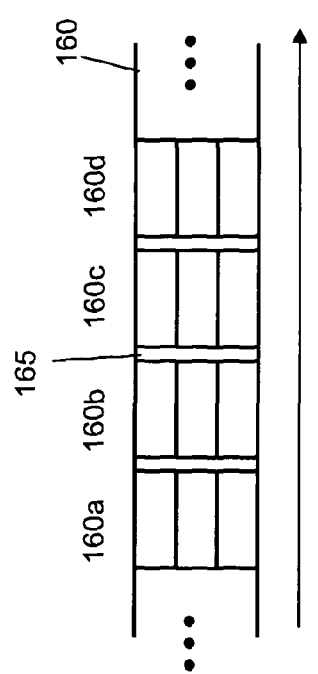

In contrast to FIG. 2a, FIG. 2b shows a similar simplified representation of a characteristic map 170, where the position of four sample intervals 170a-170b is shown when the relative speed of the sensor 100 unknowingly varies (i.e. does not remain constant). As can be seen, when travelling at a section 180 of the material 150 it seems like the sensor 100 has changed speed momentarily with respect to the material 150. Of course, this may be because the sensor 100 has jammed, or may be to because of a localised increase in friction causing the sensor 100 to slow, etc. Alternatively, the moving force of the sensor 100 may have changed momentarily (e.g. unwanted elastic effects in an actuator driving the material 150/sensor 100). Here, the second and third sample intervals 170b, 170c now overlap, while the fourth sample interval 170d is advanced with respect to where it should be.

Without having prior knowledge that the speed has varied, the data derived from the sensor 100 may be unwittingly considered accurate. For example, while the resultant images shown in FIG. 2b apparently overlap to a certain extent, the assumption would be that they are representative of a characteristic map of the material 150 in a similar manner to that shown in FIG. 2a. Thus when the images are combined, an inaccurate characteristic map 170 of the material 150 is provided. Such errors occur when using logging tools.

Unexpected or undesirable speed variations that occur with logging tools include: speed variations due to elastic effects of the cabling; speed variations due to mechanical contact of sensor with material, etc.

However, if variations in instantaneous speed can be determined or approximated, then the data derived from the sensor 100 can be corrected. Accelerometers provided with the sensor 100 have been used, but have significant draw backs, or limitations. As discussed above, due to the high forces involved, two or more different accelerometers may be needed for each sensor 100 in order to cover the full range of expected motion (i.e. high and low acceleration). The nature of the mathematical transformations involved when using accelerometers is approximate. Furthermore, the accelerometers can be difficult to calibrate and, in addition, are rarely calibrated when used in real life. Also, due to the harsh environments, the accelerometers are often damaged due to being dropped or knocked, etc.

Figure 3A:
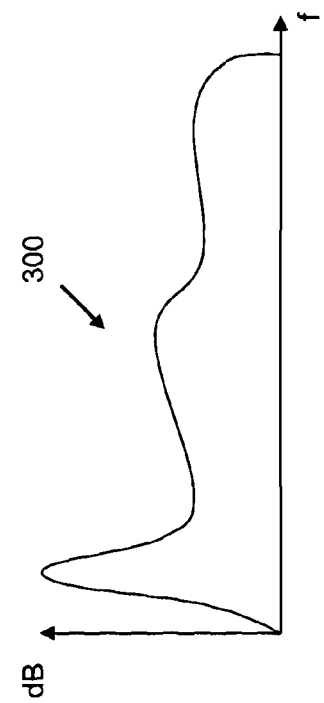
FIG. 3 shows spectral data associated with particular sample intervals of data.

Consider now FIG. 3a, which shows spectral data 300 derived from data provided from a sensor 100. The spectral data 300 is associated with the data derived from a particular row (e.g. 170a, 170b, 170c or 170d).

The spectral data 300 may be derived from particular rows of a reconstructed characteristic map 160, 170 or may be derived from the data from the sensor 100 (e.g. derived directly from raw data from the sensor). The spectral data 300 can be considered to be the accumulation of three components, which for the purposes of explanation in FIG. 3a, can be considered as three independent signals 310, 320, 330. The first signal 310 comprises information on the measurement of the material 150 itself (e.g. the measurable bulk conductivity of the material 150, etc.). The third signal 330 contains the stochastic measurement error. In other words, the third signal 330 is random noise that is present in data associated with all samples. In some cases, this third signal 330 may be considered to be inherent in the measuring process itself.

The second signal 320 is a characteristic of the material 150 itself. The characteristic does not necessarily relate to the first signal 310, but nonetheless is intrinsic to the measurement process. The characteristic relates to the grain, or underlying texture, or the material being measured. Therefore, the second signal can be considered to be a noise characteristic 320. In some cases, this noise characteristic 320 may be regarded as an unwanted noise-like signal superimposed on the desired signal 310, which may be similar in character to the third signal 330 (i.e. measurement error), but of a different character to the measurement noise. Generally, the noise characteristic 320 is more-or-less repeatable each time the sensor 100 is moved over the material 150.

Higher fidelity equipment may not completely eliminate the noise characteristic 320, as it would do with the third signal 330. For example, using the embodiment of a logging tool, the noise characteristic 320 is associated with the grain, or structure, of material being measured in a borehole, or the like. Using higher fidelity equipment may, in some cases, increase this noise characteristic 320. For comparison purposes, consider scanning paper using the sensor 100 to determine text. In that case, the noise characteristic 320 may be considered to be associated with the underlying grain, structure or texture of the paper, and not necessarily the text to be characterised (which would recorded in the first signal 310). Using higher fidelity equipment may, in some cases, make that grain/texture more apparent, rather than less apparent. In the example of a logging tool, the texture is not that of paper, but rather that of material such a rock formation, silt, sand, etc., which too has an associated grain or texture.

As mentioned, this noise characteristic 320 has a high repeatability each time the sensor 100 is passed over the material 150 (i.e. the same section of material 150). In addition, the noise characteristic 320 does not necessarily show a thermal spectrum characteristic, which might otherwise be shown with the third signal 330. Therefore, the noise characteristic 320 can be considered to be a form of pseudo-noise signal, in that it is not intended to be used to reconstruct an image 160, 170, per-se, but nonetheless can be usable to provide information about the underlying grain, structure and/or texture of the material 150. In that regard, this noise characteristic 320 may be considered to be a texture signal.

Figure 3B:
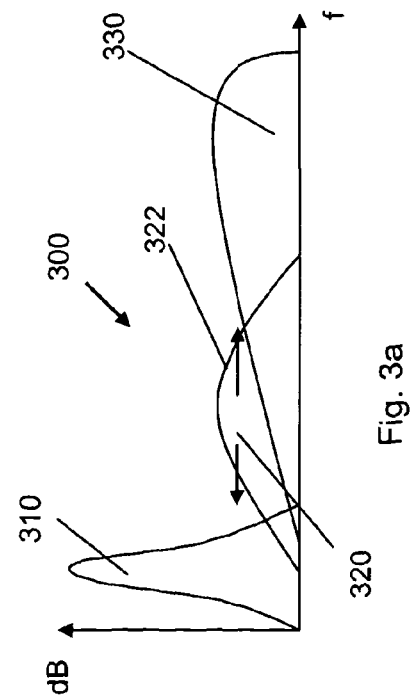

As is shown in FIG. 3a, the noise characteristic 320 can be considered to have a spectral characteristic 322 having a bandwidth profile. That is to say that the noise characteristic 320 has a particular spectrum of frequencies. Of course, the spectral data 300 may be observed as an accumulation of all the signals 310, 320, 330 as is shown FIG. 3b.

Naturally, in some cases, the structure or grain of the material 150 may vary over the material 150 (e.g. over the length of the material 150, such as over a portion of a length of borehole). This variation will have an effect on the noise characteristic 320 in that the noise characteristic 320 will vary as the grain or structure varies. However, provided the variation in structure or grain does not change significantly with respect to the spacing between different sample intervals, then the noise characteristic 320 associated with those sample intervals can be considered to be roughly constant, or constant. However, this only remains so while the relative speed of the sensor 100 remains roughly constant, or constant. Because the noise characteristic is indicative of the underlying grain or texture, the observation of this grain or texture in the direction of travel will vary when the speed of the sensor 100 varies, and thus so will the noise characteristic 320.

Therefore, the noise characteristic 320 can be considered to be associated with the relative speed of the sensor 100. As the relative speed of sensor 100 increases, the spectral characteristic 322 will shift towards higher frequencies. Similarly, as the relative speed of sensor 100 decreases, the spectral characteristic 322 will shift towards lower frequencies. This movement is indicated by arrows on FIG. 3a. Of course, the observable movement may be shown by a change of profile of the spectral data 300 shown in FIG. 3b. The amount of variation in noise characteristic 320 is related to amount of variation of speed. As such, a determined change in noise characteristic 320 can be associated with a relative change of speed of the sensor 100. The spectral data 300 can be tracked in order to determine the change in noise characteristic 320.

In other words, it is possible to use data associated with the underlying texture, or grain, of the material 150 in order to determine relative speed variations of a sensor 100 and/or material 150. Of course, in some examples, it may be difficult to track variations in spectral data 300.

Therefore, as mentioned above, while the underlying grain or texture of a material 150 to be characterised may vary over the full length of material 150, it can be assumed that irrespective of that grain or texture, the grain or texture will exhibit similar, or the same, characteristics when considered in different directions along, and/or through, the material 150 at a particular portion, or section, of material 150. In other words, irrespective of the actual texture or grain of the material 150 being measured, in some cases, this texture or grain can be considered to be roughly isotropic, or isotropic at or over a portion of the material 150. Any observed change in grain over a short distance (e.g. a few sample intervals) may correspond to a change in speed of the sensor 100.

As mentioned, it may be difficult to track variations in spectral data 300, and/or the noise characteristic 320. However, the signal information provided by the sensor 100 will vary as the noise characteristic varies, and this may be observable as a variation in signal entropy. A skilled reader will appreciate that signal entropy can be considered as an indication of the amount information being provided in a signal.

Of course, to determine whether an observed variation in signal entropy is associated with a speed variation, or merely an underlying feature of the material 150 being measured, it may be helpful to determine the variation in signal entropy substantially in the direction of travel (or intended direction of travel), as well as the entropy across the direction of travel. Because samples taken across the direction of travel at a particular sample interval will not be exposed to speed variation (they will merely be sampled across that direction), the entropy measurement across the direction of travel will be unaffected (e.g. substantially unaffected), or not affected to any extent, by a relative speed variation of the sensor 100. Therefore, an observed variation in signal entropy measured in the direction of travel can be used for the purposes of determining a speed variation when that variation is not shown, or apparent, in the entropy measured across the direction of travel. Otherwise, if there is an observed variation in signal entropy measured in the direction of travel and this corresponds to an observed variation across the direction of travel, then this may be indicative of measuring an underlying artefact.

Consider now FIG. 4a which shows individual pixels provided from data taken from the row 110 of sensor elements 100a-100c of the sensor 100 of FIG. 1. Here, the data associated with two sequential sample intervals 210, 220 is shown. In order to determine, or estimate, the entropy of data associated with the samples in the direction of travel, it is possible to estimate the entropy between pixels of sample intervals 210, 220, and in this case, adjacent pixels (e.g. 210a, 220a). This may be achieved, for example, by using the Root Mean Square (RMS) difference between the data (e.g. value of the data) associated with a sensor element (e.g. 100a) at a one particular sampling interval, and that of the same sensor element (i.e. 100a) at an alternative (e.g. preceding) sampling interval. The estimated entropy associated with the direction of travel may be taken as the integral, or average, of the estimated entropies across the row. In other words, a value of entropy for data in the direction of travel can be estimated by (i) for some or all sensor elements, estimating the entropy using data from a sample interval of a particular sensor element, with data from a further sample interval of the same sensor element and (ii) averaging, in some form, all the estimated entropies across the row.

A variation in entropy at this stage may be sufficient to suggest a variation in noise characteristic, and thus a variation in speed but, of course, as mentioned above, while a variation in entropy may be as a result of a variation in speed, in other cases, the variation may be as a result of a variation in underlying texture, or grain. In order to determine whether the variation is attributable to speed variation, or whether it is attributable to a variation in underlying texture, the entropy across the direction of travel can be determined, or estimated. The entropy across the direction of travel can then be compared with the entropy in the direction of travel to eliminate the situation when a variation in entropy in the direction of travel is associated with a variation in underlying texture.

Therefore, in a similar manner as before, the entropy associated with the data perpendicular to, or across, the direction of travel can be determined by using data provided from some or all sensor elements provided in a row (e.g. 200a, 200b) at a particular sample interval (e.g. 220). Again, the entropy of a particular row at a particular sample interval can be estimated by first using the Root Mean Square (RMS) differences between adjacent sensor elements in a row. In other words, the difference between the data provided by one sensor element in a row and a next sensor element in that row is determined. Then the squares of all those differences are averaged across the row, and then square-rooted to provide an estimation of the entropy across the direction of travel. This can then be compared with the entropy determined in the direction of travel in order to determine a difference in entropy.

Alternatively, the entropy in the direction of travel may be determined for only a few sensor elements (e.g. two sensors elements), and then compared with the entropy across the direction of travel for those few sensor elements to provide a compared entropy. This may then be repeated across some or all sensor elements, and the results averaged.

In either case, FIG. 4b shows a simplified example of pixels used to calculate entropy in, and across, the direction of travel.

For the purposes of this description, a determined, or compared, difference in entropy can be considered to be an anisotropy, whereby a variation in anisotropy may be indicative of a variation in speed of the sensor 100. In some cases, there may be present a systematic offset with respect to the entropy determined across the direction of travel, and/or the entropy determined in the direction of travel. Therefore, a variation in speed may not necessarily be associated with an absolute non-zero anisotropy, per se, but may be determined by an observed variation in anisotropy. Nevertheless, the magnitude of the variation is indicative of the amount of variation in speed.

It will be appreciated that while it was helpful to explain the above example with reference to the particular configuration of sensor of FIG. 1, in some cases, such sensors 100 may comprise more than one row 110 of sensing elements 100a-100c.

In those cases, the data associated with different rows 110 may be used to determine or estimate the entropy rather than—or in addition to—data from different sample intervals.

By using a determined variation in anisotropy—i.e. a compared variation between the entropy of data in the direction of travel and the entropy across the direction of travel—the data provided from the sensor elements 100a-100c can be corrected for speed variations of the sensor 100.

Figure 5:
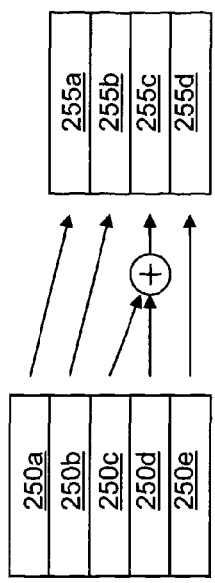
FIG. 5 shows a method for correcting data.

FIG. 5 shows an example of raw, or uncorrected data in rows 250a-250e, and corrected data in rows 255a-255d. In this example, it has been determined the entropy in the direction of travel has decreased with respect to the entropy across the direction of travel at particular row 250d of data. Therefore, there is an apparent variation in anisotropy (or an energy imbalance), which can be associated with a speed variation of the sensor 100 at that data. In this case, the determined variation in anisotropy can be associated with a decrease in speed. As mentioned, a speed variation is commensurate with the change in anisotropy. Were it to have been determined that the anisotropy of that certain row 250d had increased, then this would have been associated with an increase in speed of the sensor 100. For the purposes of explanation for the remainder of the description, a positive variation in anisotropy can be considered to be associated with an increase in speed, while a negative variation in anisotropy can be associated with a decrease in speed.

In FIG. 5, where the data in the vicinity of a certain row 250d shows a decrease in anisotropy associated with a decrease in speed, this row can be combined (e.g. by interpolation, such as two-way interpolation) with a further row 250c in order to raise the entropy in the direction of travel, and thus correct the resultant characteristic map. Alternatively, rows may be eliminated in order to correct the resultant image. In situations when the speed of the sensor 100 is determined to have increased, certain identified rows may be split, replicated, duplicated, or the like, in order to correct the resultant image.

Figure 6:
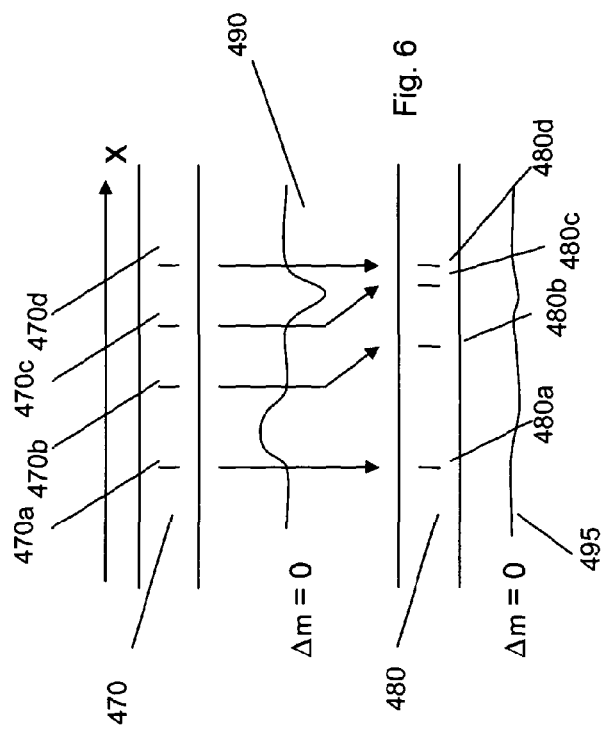
FIG. 6 shows schematically a characteristic map and a corrected characteristic map.

FIG. 6 shows a schematic illustration of where data associated with rows has been corrected by adding/removing rows of data. FIG. 6 shows an uncorrected characteristic map 450 comprising an image highlighting the data from four particular rows 470a-470d at particular sample intervals, which have been derived from the sensor 100. FIG. 6 further shows the anisotropy 490 estimate, showing a positive anisotropy between 470a and 470b indicating that the speed of the sensor has increased between those samples, and a negative anisotropy between 470c and 470d, indicting that the speed of the sensor 100 has decreased between those samples. FIG. 6 also shows a corrected characteristic map 460, in which the relative location of illustrative data 480a-480d has been moved, or corrected, based on the determined speed changes of the sensor 100. As such, the corrected map 460 is more representative of the material 150 being characterised, rather than the uncorrected map 450. Finally, FIG. 6 again shows the anisotropy estimate 495 of the corrected map, which in this case, is shown with little or no systematic offset.

Of course, in some examples a variation in speed in one sense, or direction, may be associated with a speed variation in an opposite sense, or direction. In other words, an increase in speed of the sensor 100 may correspond to a decrease of speed of the sensor 100 at a different portion of material 150. In some cases, these speed variations may be oscillatory in nature. An example of such a speed variation is the rumble effect that, from time to time, occurs as frictional effects cause the sensors movement to oscillate as the sensor moves across material. In the example of a logging tool, this oscillation can be exacerbated by springs that urge, or try to hold, the sensor 100 to the material 150. A further example oscillatory movement—with particular reference to a logging tool—is that associated with the elasticity of a cable drawing a sensor 100 across the material (i.e. pulling a tool through a borehole). This can give rise to a characteristic "bouncing" effect of the sensor 100. Of course, in further examples (e.g. outside logging tools), the oscillations may be as a result of many other factors, such as eccentric motion of a motor, or the like.

FIG. 7a shows an example of apparatus 500 for correcting data (e.g. data from a sensor 100). The apparatus 500 comprises a buffer 510, which in this example is of variable length, as will be described. The buffer 510 is configured to receive data associated with rows, as exemplified above, in a First-In, First-Out manner. In other words, data associated with rows are added to the buffer sequentially, and when the buffer is full, data entering at one end, will cause data of a row to exit at the other end, essentially the exiting rows having been held in the buffer 510 for the longest time. Therefore, in some regards, the buffer 510 can be considered to contain data associated with a portion of measured material 150.

The apparatus 500 additionally comprises a controller 540, comprising a processor 540a and a memory 540b configured in a known manner. The controller 540 is configured to determine the associated anisotropy of data of each row. In this case, the controller 540 is configured to determine the anisotropy of the data of each row as it is provided to the buffer 510. In some cases, data is provided from a sensor 520, while in other cases, data can be provided from a data store 530. The apparatus 500 may be in communication with either the data store 530, or sensor 520, either directly, or indirectly (e.g. via a network, which may be wired, wireless, or combination of both).

Figure 8:
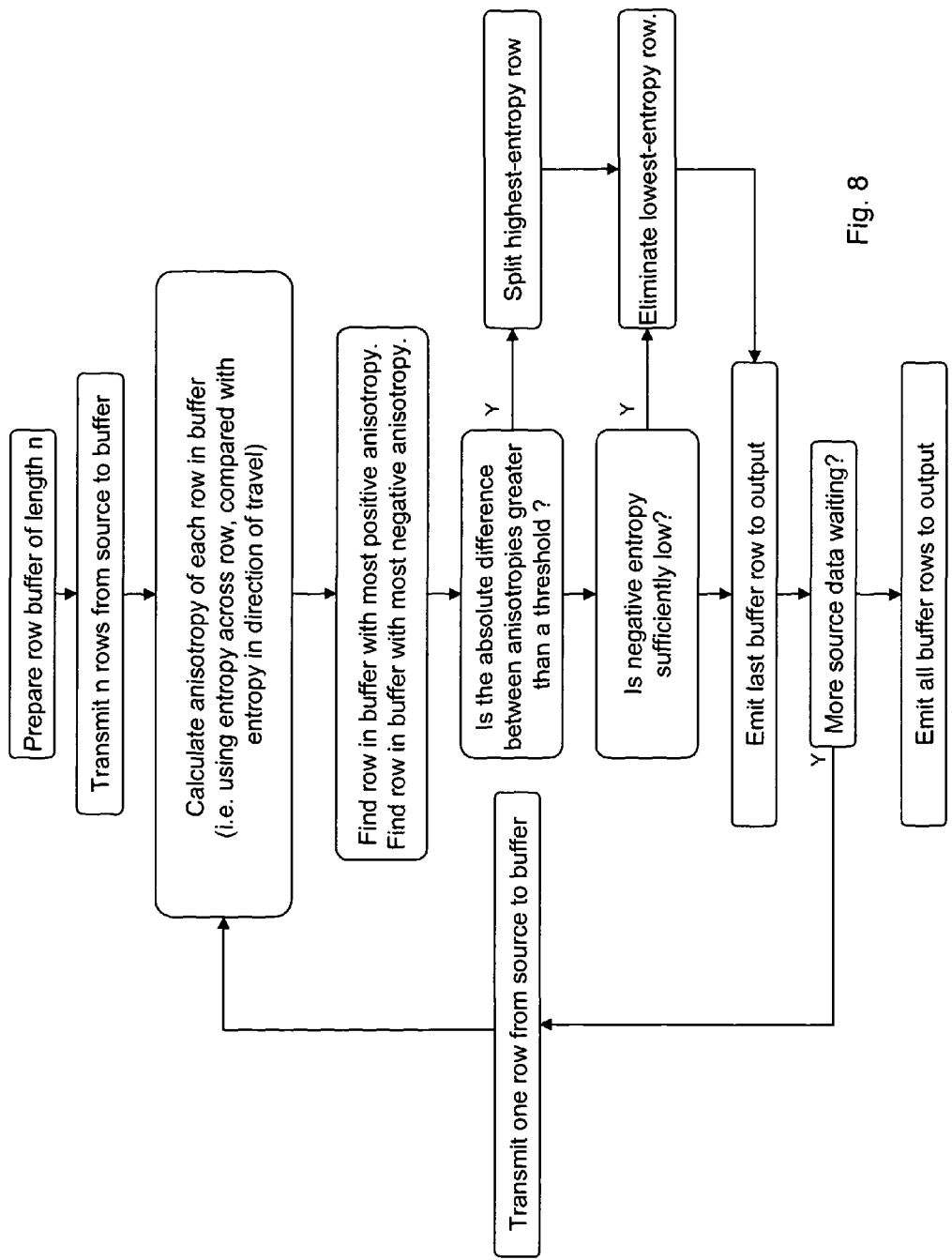
FIG. 8 shows a flow diagram of the steps taken in correcting data using the apparatus of FIG. 7.

In use, and with reference to FIG. 8, data associated with rows, or in other words, samples across the direction of travel, are provided to the buffer 510 of the apparatus 500. The size, or so-called length, of the buffer 510 is set to accommodate, or store, a particular number of rows, or samples, of data. Initially, the buffer 510 is filled with data associated with rows (e.g. 10 rows worth of data).

The controller 540 is configured to determine the anisotropy of data of each row held in the buffer 510 by using the data from that row, and data from a preceding row, in the manner exemplified in FIG. 4. The controller 540 additionally determines the largest positive anisotropy in the buffer 510 and the largest related, or corresponding, negative anisotropy in the buffer 510. The determined anisotropies can be considered when the difference (i.e. absolute difference) in anisotropies are at, or exceed, a particular threshold. Here, the threshold is taken to be associated with a standard deviation of all anisotropies values in the buffer 510 (e.g. the threshold may be exceeded when the difference between the largest positive and largest negative anisotropies are in excess of 0.5 standard deviation).

Of course, where there it is determined to be no corresponding negative and positive anisotropies in the buffer 510, this may be associated with an oscillatory speed behaviour of a frequency which is not, as yet, present in the buffer (e.g. because the frequency is too low for a complete cycle to be presented in the buffer 510, or because the buffer 510 length is too small for data from the sensor 100). In which case, the controller 540 is configured to increase the size, or length, of the buffer 510 accordingly (e.g. until such time as corresponding anisotropies are identified). In some cases, the apparatus 500 is configured such that the buffer 510 has an upper size or length, limit (e.g. 500 rows of data, or more). In other words, the apparatus may not continue to increase the buffer size beyond the upper size or length limit.

Nevertheless, when corresponding anisotropies have been determined (e.g. two corresponding anisotropies), a positive variation in anisotropy can be considered to be associated with an increase in speed, while a negative variation in anisotropy can be associated with a decrease in speed (as mentioned above). FIG. 7a shows two such exemplary rows 550a, 550b in the buffer 510: one associated with a determined positive anisotropy 550a, and the other associated with a determined negative anisotropy 550b.

In this case, the sensor 100 can be considered to have been travelling excessively when sampling row data associated with the positive anisotropy row, and likewise, travelling slowly when sampling row data associated with a negative anisotropy. To correct the data for this speed variation, data of rows associated with a decrease in speed can be removed, and data of rows can be added at or around rows associated with an increase in speed (e.g. provide artificial rows). As such, the number of rows of data remains the same in the buffer 510, but particular data has been corrected for unwanted speed variation, or oscillation (e.g. corrected to some extent). Of course, as data is passed through the buffer 510 it is progressively corrected in subsequent steps in the above described manner. In other words, a particular row may be corrected, and in a subsequent step, the data associated with the same or similar rows (e.g. adjacent rows, or new artificial rows which may still show the speed variation), can then be corrected. The process may be considered to be iterative, or progressive correction.

In some examples, rows can be artificially introduced to the buffer 510 by duplication of the data of a particular row associated with a positive anisotropy. However, the apparatus 500, in this example, is configured to create additional rows by interpolation between rows adjacent to a determined-positive-anisotropy row, as will be described with reference to FIG. 9.

FIGS. 9a and 9b show an example of three-way interpolation. FIG. 9a shows data of rows before interpolation, and FIG. 9b shows data of rows after interpolation. In FIG. 9a a particular row 580 has been identified as having positive anisotropy to be corrected. The data associated with that row, or sample, is interpolated between that row 580, a preceding row 582, and a following row 584. The result of that interpolation is data associated with two new, or artificial rows 585. In this case, the new or artificial rows 585 are positioned between the preceding row 582 and following row 584. As a consequence, data associated with the original row 580 can be discarded. In alternative embodiments, the apparatus 500 is configured to use two-way interpolation, whereby the new or artificial row 585 is provided as an interpolation between a row and an adjacent row only. Data associated with the artificial row is then inserted between the original rows.

Subsequently, if there remains more data to be corrected, then rows are fed, or received, by the buffer 510 one by one. Similarly, rows are emitted from the buffer one by one. Unless, however, the apparatus 500 has determined to increase the buffer length—as described above—in which case, rows are provided, but none emitted. In each case, when data from these samples enters the buffer 510, the controller 540 is configured again to determine the anisotropy of the entering row, by using the data from that row, and data from the preceding row, in the manner exemplified in FIG. 4, and once again configured to determine whether particular rows should be corrected in the same manner as described above. This process can be repeated until all data has been passed through the buffer. It will be appreciated that as the data is passed through the buffer 510 and corrected, the anisotropy of certain rows is reduced, or diminished (e.g. progressively reduced or diminished). FIG. 7b shows illustratively the value of anisotropy associated with rows of data in the buffer 510 as the apparatus 500 corrects data.

It will be appreciated that the apparatus 500 may be configured to initially set the buffer size smaller than would otherwise be expected. In other words, the apparatus 500 may be configured to set the size of a buffer 510 based on an expected frequency, or oscillation, of speed variation. In such cases, the buffer 510 is initially configured to be of a length smaller than would be expected in order to observe corresponding positive and negative anisotropies, and to subsequently increase the buffer size only when the apparatus 500 determines that those anisotropies are not present in the buffer 510. In such cases, the processing requirements of the apparatus 500 can be minimised.

While it has been shown that data derived from samples from a sensor 100 can be corrected by comparing the entropy of samples across the direction of travel with the entropy of samples in the direction of travel, it will be appreciated that in some cases noise, such as impulsive noise, may be comprised with the data (e.g. appear as part of the noise characteristic), which may affect entropy estimates, and hence the anisotropy estimate. Similarly, in cases where the material 150 is featureless, or relatively featureless, the anisotropy estimate may be dominated by stochastic noise, or become undefined altogether.

Therefore, consider now the measurement device 600 of FIG. 10a. Here, the measurement device 600 comprises a first and second sensor 610, 620, each similar to that described in relation to FIG. 1. For clarity, any housing, or the like, of the measurement device 600 is not shown. In this case, the sensors 610, 620 are offset by a particular distance, D, along an intended direction of travel of the measurement device 600 (as again indicated by the arrow, X, in FIG. 10). Additionally, in this example, the sensors 610, 620 are offset across the direction of travel. However, in further examples, this need not be the case, and one sensor 610, 620 may be positioned behind (e.g. fully behind) the other in the direction of travel.

FIG. 10b shows the measurement device 600 in which three sensor elements 610a, 610b, 610c, 620a, 620b, 620c of each sensor 610, 620 (i.e. without the sensor housing, or the like) are shown. Again, the sensor elements 610a, 610b, 610c, 620a, 620b, 620c are provided in rows 630, which are configured to be across the intended direction of travel.

A skilled reader will appreciate that this configuration of measurement device 600 is analogous to a simplified configuration of certain logging tools, in that such tools comprise generally two or more sensors 610, 620, generally displaced from each other in the direction of travel, but configured to move substantially together.

In use, as the device 600 is moved with respect to the material 150, the material 150 is sampled by the sensor elements 610a, 610b, 610c, 620a, 620b, 620c of each sensor 610, 620 at particular discrete sample intervals, or times (e.g. common sample intervals). In other words, at particular sample intervals, the material 150 is simultaneously sampled by the first sensor 610 and the second sensor 620, even though these sensors are offset by the distance, D. As a result, two datasets are provided: one from each sensor 610, 620, whereby rows of data in one resultant dataset are temporally spaced by a time interval, but also correspond temporally to certain rows of data in the other dataset. However, due to the offset, D, temporally corresponding rows of data will not correspond to the same relative distance along the material 150. In other words, the temporally corresponding rows of data may correspond to different regions of the sampled material 150 due to the offset, D.

In a similar manner to above, the data associated with the same sample interval can be considered to be isochronous, where isochronous data is data that has been acquired at the same, or similar, time. In some cases, the data may additionally comprise an associated time stamp, or the like. By contrast, data that is associated with the same distance along the material, (i.e. data used to provide a cumulative row spanning more than one sensor 610, 620), can be considered to be isometric—occurring at the same region of material 150). Of course, in the configuration of FIG. 10, isometric data derived from the device 600 will not necessarily be isochronous data, and vice versa.

Nevertheless, it will be appreciated that because the sensors 610, 620, are provided with the measurement device 600, then variations in the speed of the measurement device 600 will be apparent to both sensors 610, 620 at the same or similar time. Depending upon the rigidity of the measurement device 600, each sensor 610, 620 may experience changes in speed simultaneously.

Therefore, were the anisotropy to be determined for a dataset of the first sensor 610—in a similar manner to that described in relation to a single sensor 500 configuration of FIG. 7a—and this was compared with the anisotropy of the dataset from the second sensor 620, then three observable situations would occur.

Firstly, when the variation of anisotropy associated with particular rows, or samples, in first and second datasets are determined to be similar or the same at, or around, the same time (i.e. comparable anisotropy of data from temporally corresponding rows), then this anisotropy can be considered to be indicative of a change of speed of the measurement device 600, because the variation in anisotropy occurred at the same or similar time.

Secondly, when the variation of anisotropy associated with particular rows, or samples, in first and second datasets are determined to be similar, or the same, but at different times (e.g. offset times), then this anisotropy may be considered to be as a result of features in the material 150 (e.g. artefacts being measured) as one sensor (e.g. 620) measures the material 150, followed by the other sensor (e.g. 610). In some cases, by using (e.g. knowing, or approximating) the speed of the sensor 600, the time difference between these anisotropies may be used to determine or estimate (e.g. confirm) the offset, D, of the measurement device 600.

Thirdly, when the variation of anisotropy from first and second sensors 600, 700 is determined to be different and there is no determinable time relationship, or at least no determinable time relationship within a particular time window, then this variation of anisotropy can be considered to be as a result of stochastic noise.

By characterising these three situations, data can be corrected for the variable speed of the sensors 610, 620 (e.g. the variable speed of the measurement device 600). In addition, erroneous anisotropy estimates, or noise, can be discarded.

Figure 11:
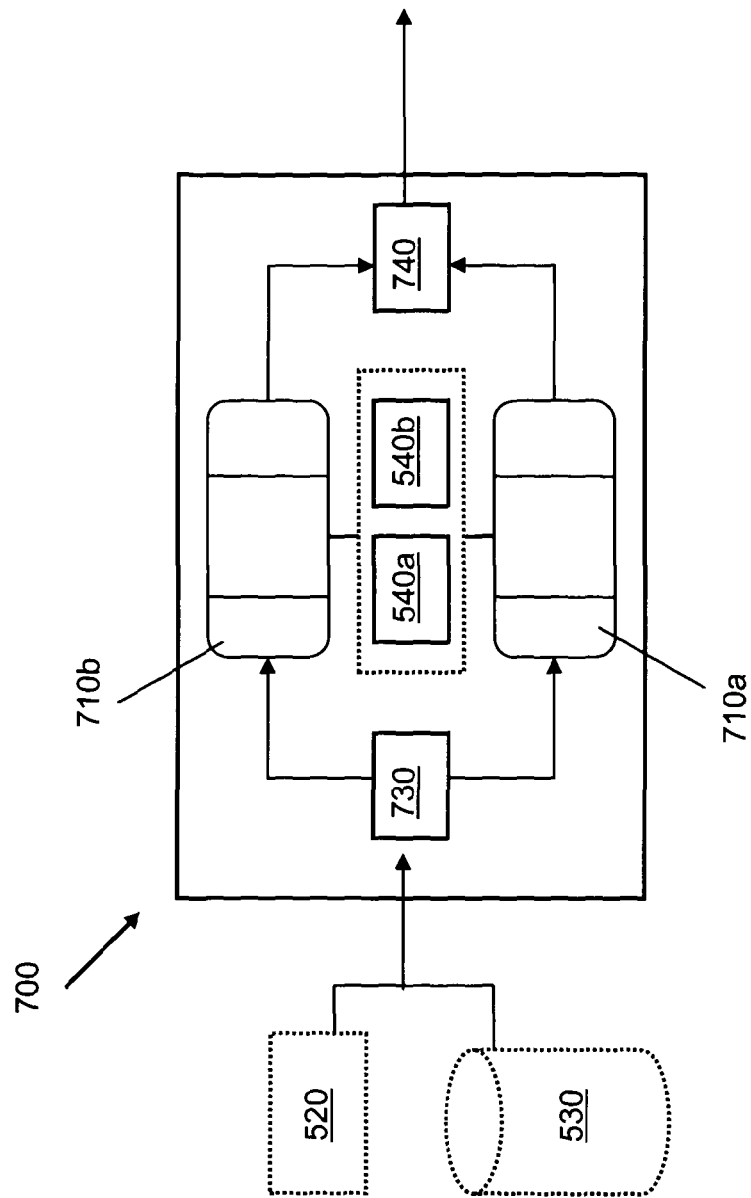
FIG. 11 shows an example of an apparatus for correcting data from a measurement device.

Consider now FIG. 11, which shows an embodiment of apparatus 700 for correcting data from a measurement device 600. Unlike the apparatus 500 of FIG. 7, the apparatus 700 of FIG. 11 comprises buffers 710a, 710b for the data from each sensor 610, 620, which in this example is two buffers 710a, 710b. Of course, in alternative embodiments, more buffers 710a, 710b may be provided if the data is derived from more than two sensors 610, 620.

Again, the buffers 710a, 710b are of variable length, and each buffer 710a, 710b is configured to receive data associated with rows from particular datasets, as exemplified above, in a First-In, First-Out manner. In other words, data associated with rows can be added to each buffer 710a, 710b (e.g. sequentially), and when the buffer is full, one row of data entering a buffer 710a, 710b, will cause one row of data to exit that buffer 710a, 710b, essentially the exiting row having been held in the buffer 710a, 710b for the longest time. Therefore, in some regards, each buffer 710a, 710b can be considered to contain data associated with a portion of measured material 150 from a particular sensor 610, 620.

Again the apparatus 700 comprises a controller 540, comprising a processor 540a and a memory 540b configured in a known manner; the controller 540 configured to determine the associated anisotropy of each row of data in respective buffers 710a 710b. And again, data can be provided from a measurement device 520, or from a data store 530, or the like. However, in this example, the apparatus 700 additionally comprises a splitter 730, configured to separate the data into appropriate datasets corresponding to respective sensors 610, 620. Of course, it will be appreciated that in further examples, such a splitter 730 may not be used as that data may already be partitioned into datasets. Data for each dataset associated with a sensor 610, 620 is provided to respective buffers 710a, 710b such that corresponding rows in each buffer are isochronous. That is to say that data associated with the same time is positioned correspondingly in each buffer 710a, 710b (e.g. corresponding rows of each buffer comprises data taken from the same sample interval). The apparatus 700 also comprises a combiner 740, configured to combine data for output from the apparatus 700. Again, in some examples, the combiner 740 may not be used.

Figure 12:
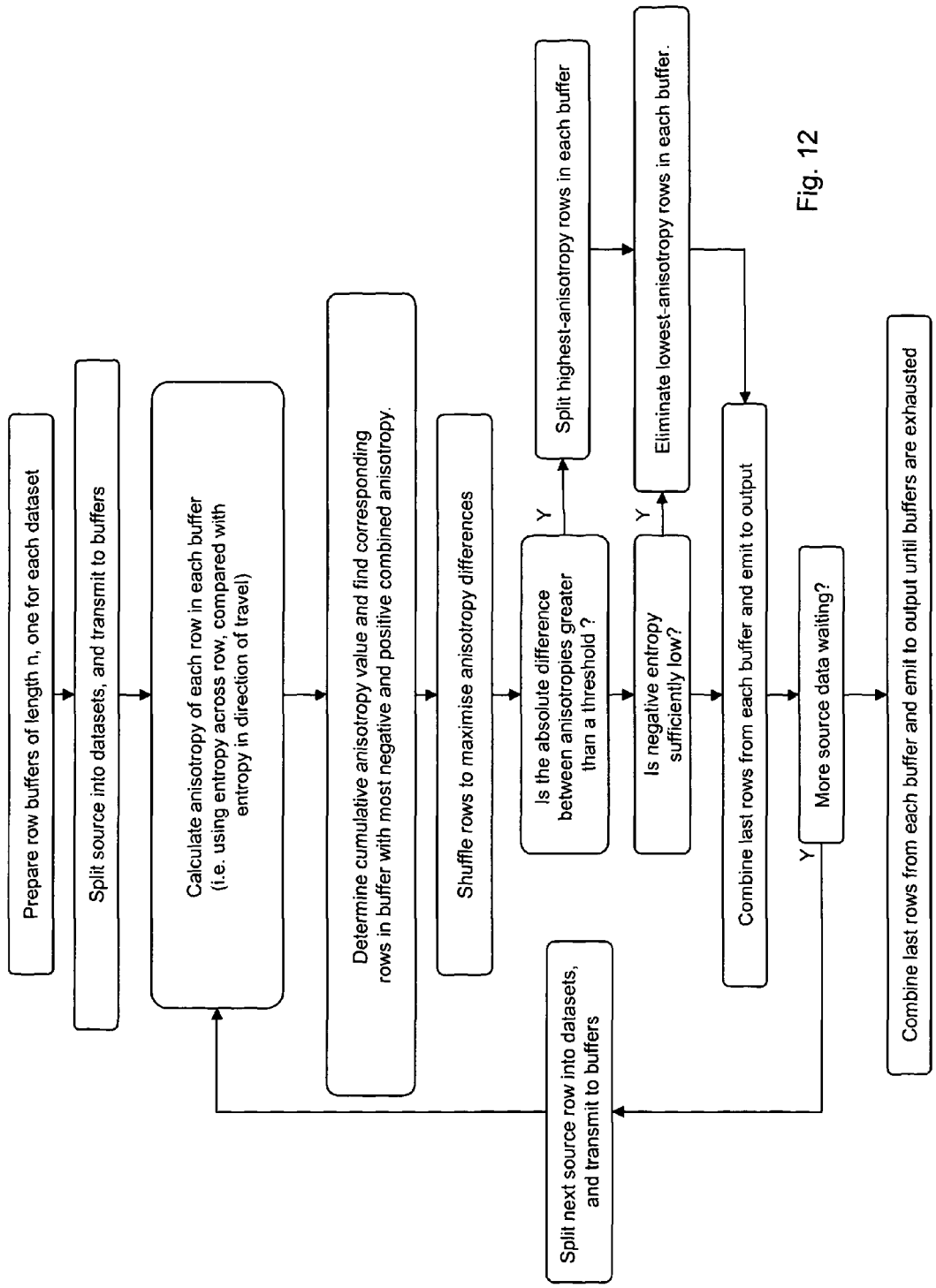
FIG. 12 shows a flow diagram of exemplary steps when using the apparatus of FIG. 11

In use, and with reference to FIGS. 12 and 13, the apparatus 700 sets the size of the buffers 710, 710b in a similar manner as before. In this case, each buffer 710a, 710b is configured to be the same size. Data is again fed to, or received by, each buffer 710a, 710b. However, in this example the data may be initially split using the splitter 730 into datasets corresponding to data from each sensor 610, 620. Again, the anisotropies associated with data of each row are determined by the controller 540.

However, in this example, in order to correct for speed variation, a determined corresponding positive/negative anisotropy observed in one buffer 710a, should also be observed in another buffer 710b at the same, or similar row (as outlined above). If the determined anisotropies do not correlate in such a manner, then those anisotropies may be as a result of underlying features, or noise, in which case, the data associated with those rows should not be corrected. In some examples, a comparison of anisotropies can be made from one buffer to another, and where a correlation occurs, the data in each buffer 710a, 710b can be corrected in a similar manner as described before (e.g. cf. FIG. 9).

However, it will be appreciated that in some cases, the determined anisotropies for each row may additionally comprise noise (e.g. systematic noise). This noise may affect the absolute determined value of the anisotropy, making comparison between buffers 710a, 710b difficult. As such, the apparatus 700 in this example is configured to determine a cumulative anisotropy value for temporally corresponding rows in both buffers 710a, 710b. The cumulative anisotropy value is a common mode value based on the anisotropy value of corresponding rows. As such, corresponding variations in anisotropy can be identified. In this example, the apparatus is configured to use Gaussian common mode analysis to provide a cumulative anisotropy value for the temporally corresponding rows in both buffers 710a, 710b. As such, the cumulative anisotropy value is positive when corresponding rows show a positive variation in anisotropy, (b) is negative when corresponding rows show a negative variation in anisotropy (c) is neutral, or unaffected, when either corresponding row is neutral (i.e. irrespective of what the other is doing) or when the variation in anisotropy estimates of corresponding rows disagree.

An example of a Gaussian common mode analysis using values $A_i$ is:

$$E = \overline{A} \cdot e^{\left(\frac{-k\sigma^2}{\overline{A}^2}\right)}$$

Where E is associated with the cumulative anisotropy value, $\overline{A}$ is the mean of $A_i$ (which are anisotropy estimates), and $\sigma$ is the standard deviation of $A_i$. The factor k can be used to determine how selective the apparatus is: the larger the value of k, the greater the agreement is needed before the analysis suggests that the anisotropies variations correspond. In the example of the apparatus of FIG. 11, the factor k is set to in the region of 3, which provides that the anisotropies correspond when the anisotropies are within about 50% of each other. It will be appreciated that using this analysis can adjusts itself for scale.

When sigma is large compared with the mean (e.g. when the $A_i$ does not agree very well) the output is approximately zero. Where sigma is about zero (e.g. the $A_i$ agree very closely) then the output is approximately the mean. Between these situations, there is a smooth transition, which as a result is scale invariant.

It will be appreciated that providing the value of k allows a user to configure the apparatus for selectivity and sensitivity. By providing a higher value of k, the apparatus 700 it more likely to detect corresponding anisotropies. Of course, if the data is noisy, then the apparatus 700 may be less likely to observe that correspondence. Setting k at 3, or roughly 3 provides is a useful tradeoff between selectivity and sensitivity.

Figure 13A:
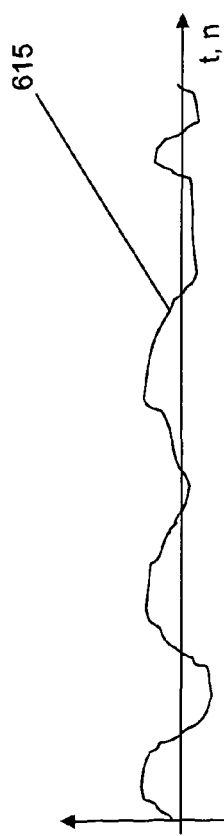
FIG. 13 shows a plot of anisotropy estimates from two datasets and the associated cumulative anisotropy value.
Figure 13B:
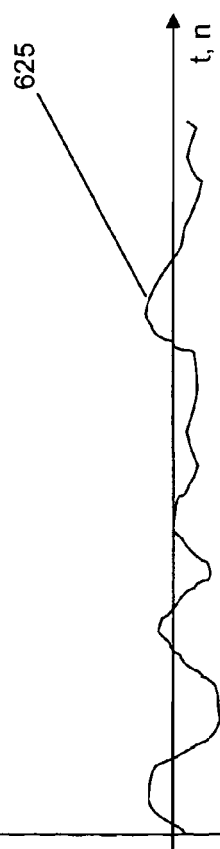
Figure 13C:
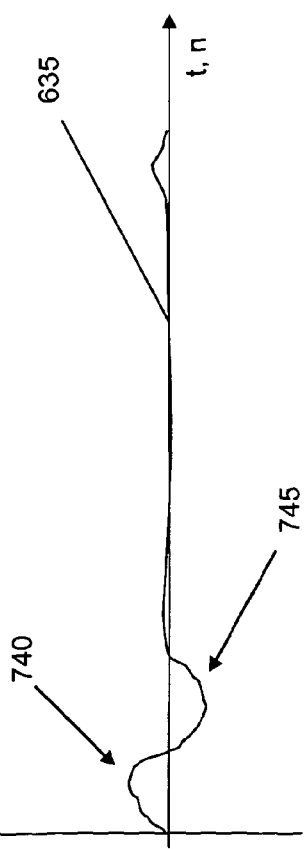

The apparatus 700 is further configured to use the cumulative anisotropy value in order to correct the data in each buffer 710a, 710b, as will be described with reference to FIG. 13, which shows two exemplary plots of anisotropy 615, 625 against sample time, or position in buffer, of respective datasets associated with particular respective sensors 610, 620—in this example, sample time and position in the buffer are interrelated. FIG. 13a shows the determined anisotropy 615 from a dataset associated with the first sensor 610 (e.g. in a first buffer 710a), while FIG. 13b shows the determined anisotropy 625 from a dataset associated with the second sensor 620 (e.g. in a second buffer 710b). As can be seen, the determined anisotropy levels increase and decrease throughout the data. Noise, such as systematic errors, affect the determined anisotropy in each sensor 610, 620 sometimes independently. Therefore, in order to determine where there has been a corresponding increase or decrease in anisotropy (as-sociated with a variation in speed affecting the measurement device 600) the cumulative anisotropy value 635 is determined, as shown in FIG. 13c (i.e. the common mode value of anisotropy of corresponding rows). As can be seen, the cumulative anisotropy value varies when the anisotropy of data in the first and second buffer vary in synchrony, or roughly in synchrony. Otherwise, it stays neutral, or roughly neutral.

The cumulative anisotropy value 635 allows the apparatus 700 to determine, not necessarily the absolute value of the anisotropy in each buffer (which may be affected by noise), but rather whether there is an observed common variation in anisotropy that is common to the data from the first dataset and the second dataset. In other words, the cumulative anisotropy value 635 allows for determining whether the anisotropy from the first dataset is moving in the same direction at the same time as the anisotropy in the second data set. Of course, while in this example, the cumulative anisotropy value is determined by using common mode methods (e.g. a common-mode detector) using Gaussian methods, in further examples, this need not be the case. In alternative embodiments the cumulative anisotropy value may be determined by summing the of anisotropy values 615, 625 from each buffer. Again, such a determined cumulative anisotropy value 635 may be considered to be a common mode value.

By determining and using the cumulative anisotropy value 635, the apparatus 700 is configured to correct data in each row in a similar manner as was described with respect to FIGS. 7 and 8, in that corresponding positive and negative anisotropies can be identified, and corrected (e.g. within the buffer 710a, 710b).

FIG. 13c shows examples of corresponding positive anisotropy 740 and negative anisotropy 745 of the cumulative anisotropy value 635 that may be used to correct corresponding row data in the first and second buffer 710a, 710b in a similar manner to before (e.g. when the difference between the anisotropies exceeds a particular threshold value, such as ½ standard deviation value). In this example, of course, the corresponding positive and negative anisotropies are provided with the cumulative anisotropy value 635.

Unlike the apparatus 500 of FIG. 7a, the apparatus 700 of FIG. 11 is configured to correct data from more than one sensor 610, 620 (exemplified by using two sensors 610, 620).

In some cases, localised movement of one or more sensors 610, 620 (e.g. when contacting the material 150) might mean that speed variations experienced by the measurement device 600 are observed, not on corresponding isochronous rows, but rather on rows in the region of being isochronous (i.e. preceding, and/or following rows). To accommodate this, the apparatus 700, in some embodiments is configured to select rows from the two buffers, which may not correspond to the same sample interval (i.e. may not relate to isochronous data), but rather are nearby (e.g. temporally within two or three rows) in order to provide a maximised anisotropy difference between positive and negative anisotropy. For example, if the most positive aggregated anisotropy is at row 20 in the buffers (so row 20 is the one that will be split), the apparatus is additionally configured to determine the potential positive anisotropy by using rows 19 and 21 from the respective buffers. Where the positive anisotropy is determined to be higher, then those rows are used instead. This is similarly done for the most negative determined anisotropy. FIG. 12 refers to this as a "shuffle".

A skilled reader will appreciate that in some embodiments, the apparatus 700 is configured to vary each buffer 710a, 710b size or length based on certain conditions, in a similar manner to that described in relation to FIG. 7a.

Of course, it will similarly be appreciated that while data output from the apparatus 700 of FIG. 11 may be corrected for speed variations, the data associated with one dataset, is still only temporally associated with data from another dataset, or sensor. Merely aligning corresponding data from each dataset would not provide a suitable characteristic map because of the offset, D, between the sensors 610, 620. In other words, the data provided from the apparatus may be isochronous, and may be corrected for unwanted speed variations, but the data may not be isometric.

In some cases, by knowing, estimating, or guessing the offset, D, between sensors 610, 620 and the speed of the sensors (.e.g. device 600), one dataset can be advanced with respect to another in order to align data to provide a characteristic map. FIG. 14 shows a simplified representation of moving one dataset 760 comprising data from a sensor (e.g. 620) associated with rows, with respect to another dataset 765 comprising data from a sensor (e.g. 610) in order to provide isometric data, and to allow reconstruction as a characteristic map 770 of the material 150. Of course, it will be appreciated that in some cases, moving data may comprise amending, or modifying, an associated time stamp of particular rows of data.

However, the speed of the device 600 and/or the offset between the sensors 610, 620 may not be known, or known accurately enough in order to modify one dataset 760 with respect to another 765. Similarly, due to variations in the speed of the sensor/device, it may not be appropriate to correct for the same offset through the entire dataset 760, 765.

Consider now FIG. 15 which shows data represented as pixels from two datasets 810, 820 associated with two sensors (e.g. 610, 620). For ease of explanation, each row of each dataset 810, 820 comprises six pixels, corresponding to data provided from six sensor elements of a particular sensor (cf. FIG. 10b which would provide three pixels).

Here, corresponding rows between the datasets 810, 820 are isochronous (e.g. they are associated with the same sample interval, and/or have the same time stamp). Each dataset 810, 820 may, or may not have been corrected for speed variation, as described above. In order to provide an accurate characteristic map, the data of the first dataset 810 is to be advanced or retarded with respect to the second dataset 820.

In order to do so, certain features in the data can be determined and correlated. For the purposes of this description, such features of the data that correlate to a particular extent are referred to as signatures. So-called signatures in each dataset 810, 820 can be identified and may be considered to be representative of a feature, or property of data, that can be correlated between datasets. For example, a signature may be associated with particular striations or artefacts that have been measured in the material 150. As the measurement device 600 measures these artefacts, they will be present in the data from each dataset, but only at different sample intervals, or times, due to the offset between the sensors 610, 620.

In order to correct for the offset between sensors (e.g. 610, 620), these signatures can be identified, and brought into registration, or alignment. In FIG. 15 each pixel is represented as a particular density. For the purposes of explanation, only two densities have been shown: dark and light. A dark pixel is given when data provided from a particular sensor element suggests a certain underlying property of the material (e.g. a particular conductivity suggesting a particular material type), while a light pixel is given when data provided from a particular sensor element suggests a different underlying property of the material (e.g. a different conductivity suggesting a different material type).

FIG. 15 additionally shows a data integral 815, 825 for each row, which in this case has been represented as a pixel also. The data integral 815, 825 comprises the integral of the data provided across each row of a particular dataset. For simplicity, this again has been represented as either dark or light, based on the average of each row. The data integral 815 can be considered to be used for determination of particular signatures.

As can be seen, at particular rows, there is an indication that the measurement device 600 has measured a particular observable or unique artefact in the material 150, which can be used as a signature 830. By correlating the data integral 815 of one dataset 810 with the data integral 825 of the other dataset 820, it is possible to determine corresponding signatures for use as a keyframe representing the offset at that point in time. Such correlation (e.g. Fourier correlation, which may be 2D Fourier correlation) can provide an indication as to the extent that the data integrals 815, 825 are similar. In addition, such correlation can provide the offset between such similar data integrals. In other words, by correlating the data integrals 815 of the first dataset 810 with the data integrals 825 of the second dataset 820, data representative of the sureness of correlation can be provided (i.e.—the offset and the extent of correlation). By using a peak detect methods, it is possible to identify particular keyframes (e.g. correlated or corresponding signatures) in that data which can be used to correct for the offset between the sensors. This can be considered to be statistical analysis of the data.

Of course, while in the example of FIG. 15, only a single row is shown as a keyframe, it will be appreciated that this is exemplary only. In some case, the keyframes may be provided by data from a plurality of rows. In other words, keyframes may be provided as a result of a correlation of some or many underlying features or signatures in a material (e.g. bandings, or the like, as exemplified in FIG. 16a).

Consider now FIG. 17, which, by way of example, diagrammatically illustrates correcting data by determining a feature, or signature, in data from the first sensor 610, the feature associated with an artefact in material 150 being measured, and determining a feature in data from the second sensor 620, correlating these features or signatures, and using the correlations to generate keyframes to correct the data (e.g. to be isometric).

FIG. 17a shows isochronous data 840 for two datasets 842, 845 from two sensors (e.g. 610, 620). The data 840 may or may not have been corrected for speed variation. In other words, in some examples, the data 840 may be raw data. Using the above described methodology, three separate keyframes 860a, 860b, 860c have been identified, and have been shown on FIG. 17. As can be seen in FIG. 17a, each of the keyframes 860a, 860b, 860c indicate that the offset between one dataset 842 and the other dataset 844 is not regular, of common, throughout the data. By way of example, consider: (a) that the first keyframe 860a suggests that the second dataset 844 needs to be moved by 10 rows with respect to the first dataset 842; (b) that the second keyframe 860b suggests that the second dataset 844 needs to be moved by 20 rows with respect to the first dataset 842; and (c) that the third keyframe 860c suggests that the second dataset 844 needs to be moved by 17 rows with respect to the first dataset 842. In other words, simply moving one dataset 842, 846 temporally with respect to the other will not bring all the keyframes 860a, 860b, 860c into respective registration, or alignment.

At a first step, as shown in FIG. 17b, the data of one or both of the first and second datasets 842 is amended such that the first keyframe 860a is in alignment between respective datasets 842, 844. This is achieved, for example, by moving data of one of the datasets for the 10-row offset (i.e. amending each row in a particular dataset to effectively advance it by 10). Of course, in some examples, this may mean amending or correcting timestamps of data associated with one, or both of the datasets 842, 844. Nevertheless, by moving one dataset 844 with respect to the other 842, the first keyframe 860a is now aligned, but the second keyframe 860b still suggests that the second dataset 844 needs to be moved, now by only 10 rows (i.e. 20−10=10), with respect to the first dataset 842 while the third keyframe 860c suggests that the second dataset 844 needs to be moved, now only by 7 rows, with respect to the first dataset 842.

At a second step, shown in FIG. 17c, the data of second dataset 842 and/or the first dataset 842 can be amended such that the second keyframe 860a is brought into alignment between respective datasets 842, 844. In this example, this is achieved by adding rows or deleting rows in a similar manner as when correcting for speed variation (cf. FIG. 9). Data associated with rows between the first and second keyframes 860a, 860b are interpolated and replaced by interpolated rows of data. In this example, data associated with rows from the second dataset 844 are deleted, or eliminated using interpolation, while rows from the first dataset 842 are added using interpolation. Effectively, the first dataset 842 is increased by five rows between the first and second keyframes 860a, 860b, while the second dataset 842 has decreased by five rows between the first and second keyframes 860a, 860b. As such, it will be appreciated that this addition and/or removal has an effect on the remainder of the datasets, as exemplified in FIG. 17c.

As is shown in FIG. 17c, the first dataset 842 has effectively expanded, while the second dataset 840 has effectively shrunk, as shown at by the expansion and contraction at 846. In addition, the third keyframe 860c now suggests that the second dataset 844 needs to be moved, now only by 3 rows and in an opposite sense to above, with respect to the first dataset 842. However, in a similar manner to above, the third keyframe can be brought into alignment by interpolating the data between the second and third keyframes 860b, 860c. FIG. 17d shows the fully corrected datasets 842, 844 for the offset between first and second sensors 610, 620. These dataset 842, 844 can then be used to provide a characteristic map of the material 150. The above described process may be considered to be a morph. It will be appreciated that in some cases the datasets 842, 844 will also have been corrected for speed variation.

While in the above example has been described with particular reference to correlating data integrals 815, 825 in order to correct for the offset between datasets, it will be appreciated that in further embodiments, the features used for correcting data may be associated with an artefact in material in a different manner. For example, the features used to correlate datasets may be associated with the determined anisotropy. Recall, that when the anisotropy associated with particular rows, or samples, of first and second datasets are determined to be similar, or the same, but at different times (e.g. offset times), then this anisotropy may be considered to be as a result of features in the material 150 (e.g. artefacts being measured) as one sensor (e.g. 620) measures the material 150, followed by the other sensor (e.g. 610). Therefore, in some embodiments, determined anisotropies may be correlated, or used, in order to correct for an offset between the datasets (e.g. D) so as to provide an appropriate characteristic map.

In addition, although the use of correlation has been described in order to correct for an offset between sensors 610, 620, it will be appreciated that the same methodology can be used to correct for an offset that may exist between particular sensor elements provided on a particular sensor 610, 620 (e.g. where a sensor element comprises two rows of sensor elements offset from one another in the direction of travel).

In addition, it will be appreciated that in some examples, a particular row of sensor elements may not be entirely aligned across a direction of travel. In some cases, sensor elements of a particular row 890 may be interleaved whereby one sensor element is slightly advanced with respect to adjacent sensor element, as exemplified in FIG. 16b. Such a row 890 configuration may help accommodate further sensor elements on a particular sensor. The result is a sawtooth effect in the images.

To correct this further so that the image of such a row 890 is isometric, the data associated with the interleaved images can be brought back into registration. Firstly, data from the row 890 can be split essentially into two sub-rows: data from the upper row of sensors elements and the data from the bottom row of sensors element. Two images from the sub-rows are likely to be similar or identical, but they are shifted with respect to one another. By taking a 2D Fourier transform data of each sub-row (e.g. FFT of both), combining the result, and then transforming this back, it is possible to get an image which shows the 2D correlation in a similar manner as above. Again, it is possible to search for a peak (which in the case of a logging tool will be on or very near to the vertical axis, because the images are the same) to generate the keyframe.

Similarly, while in the above examples, it has been suggested that features are present to a device 600 in a form of artefact banding or otherwise, it will be appreciated that in the case of a logging tool measuring a borehole, such artefact bandings may present themselves as a sinusoidal, or tilting, representation in situations when the tool, or device 600, is oriented at an angle to some form of striation, or artefact.

In such cases, it is possible to use projection-slice transforms. When artefacts being imaged are tilted, then the row integral intersects several strata or bands, and some detail may be lost. In which case, at the extreme, it may not be possible to correlate the images. By using projection-slice transforms (which is a well known mathematical technique) it is possible to integrate in the direction of the tilt, or titling artefact, etc.

By taking a 2D Fourier transform of a 2D image (e.g. the image provided in a dataset), then where artefacts (e.g. tilting artefacts, or the like) are present in the image, then the Fourier transform shows a distinct pattern in a direction normal to the artefact. Creating a 1D spectrum through that determined pattern, and de-transforming that 1D spectrum, provides an integral taken along the desired artefact. These integrals can then be correlated, rather than the row integrals.

Of course, it will be appreciated that in some cases, if a determined artefact suggests that an image should be integrated in an upward-sloping direction, then the next is nearly horizontal, then the next is sloping down, then the middle one is possibly ahead of the two sloping ones. And that means, as well as having more information to correlate for the offset between datasets, it is also possible to use this information to determine what type of correlation might be used. Such an analysis can help improve results. In other words, the correlation is based on two signals, not just one: the alternative integral, plus the information regarding the possible offset.

While in the above described embodiments, two offset sensors are described it will be appreciated that in some cases—such as those used as logging tools—the sensors may be configured somewhat differently. Consider now, by way of example, a measurement device 900 shown in FIG. 18*a*, which is presented as simplified logging tool. Here, the device 900 again, by way of an example, comprises a first sensor and a second sensor 910, 920. However, each sensor 910, 920 comprises three pads 910*a*, 910*b*, 910*c*, 920*a*, 920*b*, 920*c*, which are circumferentially spaced. The sensors 910, 920 are configured so as to be able to measure, or characterise a borehole. FIG. 18*b* shows the sensors 910, 920 oriented not in a cylindrical representation, but in a linear representation (i.e. were the device 900 to be unrolled). It will be appreciated that each pad 910*a*, 910*b*, 910*c*, 920*a*, 920*b*, 920*c* may comprise sensor elements in a similar manner as described above. However, for clarity these are not shown here. In some examples, some or all of the pads 910*a*, 910*b*, 910*c*, 920*a*, 920*b*, 920*c* comprise a plurality of rows of sensor elements. FIG. 18 also shows the intended direction of travel, X, of the device 900.

FIG. 19 shows an example of a borehole 1101 oriented at an angle with respect to a striation 1102, or artefact, being measured. This orientation may be as a result of the striation dipping, and/or may be as a result of the orientation of the device 900, and/or may be as a result of the borehole Nevertheless, FIG. 20 shows a simplified representation of the resultant isochronous image provided from each sensor pad 910*a*, 910*b*, 910*c*, 920*a*, 920*b*, 920*c*. Because the data has yet to be corrected for the offset between the first and second sensors 910, 920, one set of data is effectively advanced with respect to the other, in a similar manner as before (e.g. FIGS. 14 and 15).

In this example, rather than provide a single data integral for the first and second sensor 910, a data integral 930 is taken for each pad 910*a*, 910*b*, 910*c* of the first sensor, and a data integral 940 is taken for each pad 920*a*, 920*b*, 920*c* of the second sensor 920, as exemplified in FIGS. 21*a* and 21*b*. These respective pad data integrals 930, 940 are then corrected for offset (e.g. depth shifted) using the above described methodology for each sensor 910, 920 to provide a core data integral 950. The core data integral 950 may be considered to be representative of the observed artefact, or striation 1102, which would otherwise be observed at the central axis of the device 900. Both core data integrals 950 can then be used as integrals which can be correlated to generate keyframes that can be used to correct for the offset again, as is shown in FIG. 21*c*. In other words, the pad data integral associated with data from the pads are effectively averaged using the offset correction methodology described to provide a core data integral. Subsequently, the core data integral associated with data from each sensor is correlated to provide keyframes that can be used to correct the offset between the sensors. FIG. 22 shows a simplified representation of the corrected image comprising the striation 1102 measured by the measurement device 900. Data from magnetometers, or the like, can be used to determine the orientation of the device 900, and/or striation 1102, and allow for correcting for the curved representation of the measured artefact, and/or measuring the tilt of the striation. It will be appreciated that until now, measuring such tilting accurately has been difficult. It will also be appreciated that accurately determining such titling using the above described methodology is particularly useful in the oil and gas industry (e.g. for prospecting), whereby an accurate indication as to the formation of subterranean striation may allow users to extrapolate from one or more particular locations (e.g. pilot wells/boreholes) where valuable hydrocarbon bearing formations may be present.

For example, it will be appreciated that the absolute tilt of a striation can determined by (a) using the observed, or apparent, tilt of striation taken from data from such measurement devices; and (b) using the absolute orientation of the measurement device, which generally can be provided from magnetometers.

However, by using the methodology described in relation to FIG. 21 (e.g. FIG. 21*a*) it is possible to determine the apparent tilt of an observed artefact, or striation, using the pad data integrals 930. In some cases, determining such an apparent tilt may additionally use the location, or configuration, of the sensor pads.

In addition, in some cases, such a determined tilt can be confirmed by using (e.g. comparing) a tilt determined from data integrals of one sensor (e.g. FIG. 21*a*) with another sensor (e.g. FIG. 21*b*).

Figure 23:
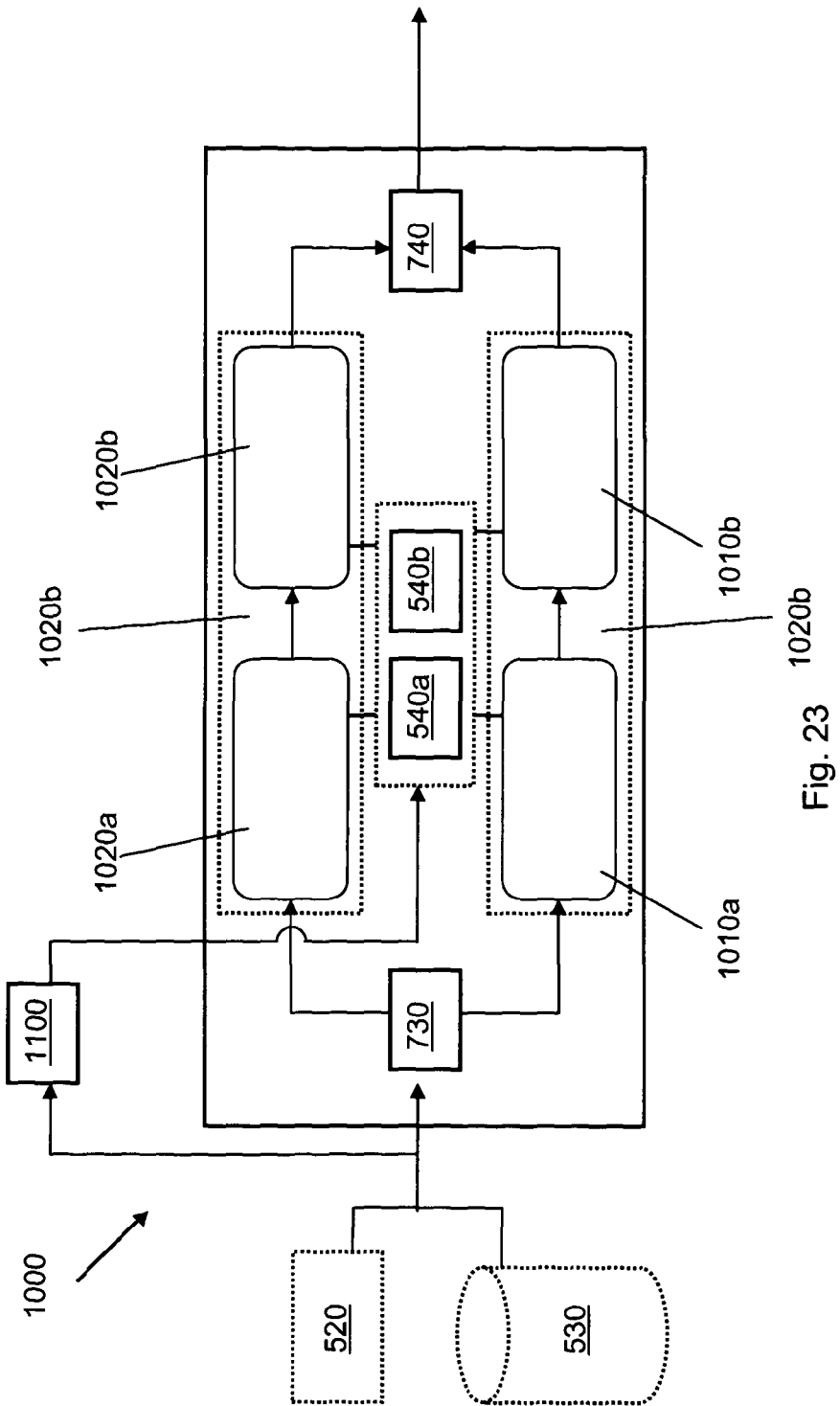
FIG. 23 shows an apparatus for correcting data from a device using features in the data.

FIG. 23 shows an example of an apparatus 1000 for correcting data using a feature in data from a first and second sensors 610, 910, 620, 920 of a measurement device 600, 900, the sensors 610, 910, 620, 920 being offset along the intended direction of travel. Unlike the apparatus 500 of FIG. 7, or the apparatus 700 of FIG. 11, the apparatus 1000 of FIG. 23 comprises two buffers 1010, 1020 for data from each sensor 610, 910, 620, 920: an input buffer 1010*a*, 1020*a* and an output buffer, 1010*b*, 1020*b*. Of course, in alternative embodiments, these may be provided by a single buffer, as will be appreciated when considering the following description. Additionally, it will be appreciated that additional buffers may be provided if the data is derived from more than two sensors 610, 620, 910, 920.

Again, the each of the buffers 1010, 1020 are of variable length, and each buffer 1010, 1020 is configured to receive data associated with rows from particular datasets. In this example, the input buffers 1010*a*, 1020*a* are configured to sequentially receive data associated with rows from a data source, sensor, or the like. The output buffers 1010*b*, 1020*b* are configured to sequentially receive data from the input buffers 1010*a*, 1020*a*.

Again the apparatus 1000 comprises a controller 540, comprising a processor 540*a* and a memory 540*b* configured in a known manner. In this example, however, the controller is in communication with a statistical analyser 1100, configured to determine keyframes in datasets associated with each sensor 610, 620, 910, 920. In this example, the statistical analyser 1100 is shown to be distinct from the apparatus 1000 but, of course, in alternative embodiments, the statistical analyser 1100 may be comprised with the apparatus 1000. Here, the statistical analyser 1100 is configured to determine a feature in data associated with a first sensor and a second sensor, the feature associated with an artefact in material 150 being measured (e.g. an artefact presented as a density in an image, of an observed offset in anisotropy, of a core image, etc.). The statistical analyser 1100 is further configured to correlate such features (e.g. using Fourier correlation), and to provide an indication of particular keyframes in the datasets.

Data can be provided to the statistical analyser 1100 from a device 900 or from a data store 530, or the like. Again, the apparatus 1000 is comprised with a splitter 730, and combiner 740.

Figure 24:
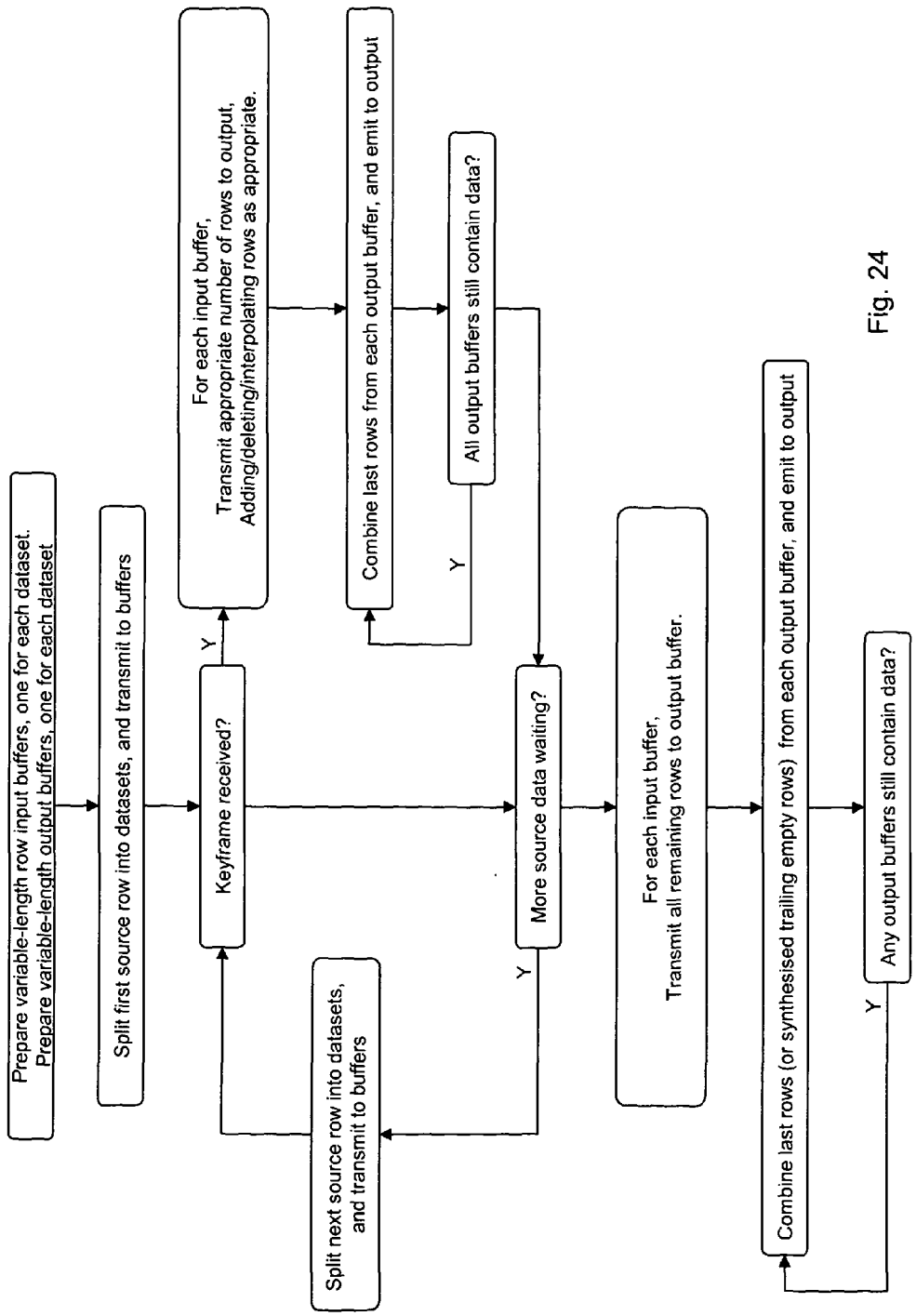
FIG. 24 shows a flow diagram of exemplary steps taken by the apparatus of FIG. 23.

In use, and with reference to FIG. 24, data from each dataset associated with a sensor 910, 920 is provided to respective input buffers 1010a, 1020a until a first keyframe (e.g. 860) is received in both input buffers 1010a, 1020a. When the first keyframe is received, generally one dataset will comprise more rows that the other. The absence of rows relates to a region in which when the device 900 first measured or scanned the material 150, whereby one sensor was advanced with respect to the other. As such, in this example, data (e.g. blank data) can be used, or prepended, to "fill in" the absent rows. The data within each input buffer 1010a, 1020a is then passed to the respective output buffers 1010b, 1020b, until the output buffers 1010b, 1020b contains data up to the first keyframe (e.g. 860a), and the length or size (i.e. number of rows) of each output buffer 1010b, 1020b is the same. While each output buffer 1020a, 1020b contains row data, the data for each dataset can be output.

For some of the time, the output buffers will be empty. When the input buffers feed data to the output buffers (correcting as they go) one buffer may provide more row data to the output buffer than the other at a particular instance. However, as rows are used to create the output sequence, if one buffer advances with respect to the other, then data is stored in the output buffer until the other catches up. However, in general, if there is data in both output buffers, they then provide that data as an output.

Subsequently, or at a similar or same time, the input buffers receive data from each dataset until the second keyframe arrives, as determined by the statistical analyser 1100. Again, the data from each input buffer 101a, 1020a is passed to respective output buffers 1020a, 1020b in such a manner that particular rows are deleted, or interpolated, as described with reference to FIG. 17, until the data is corrected and respective output buffers 1010b, 1020b contain the same number of rows. The data in the output buffer 1010b, 1020b can then be output for use in a characteristic map. This process continues until all the data has been corrected.

Figure 25:
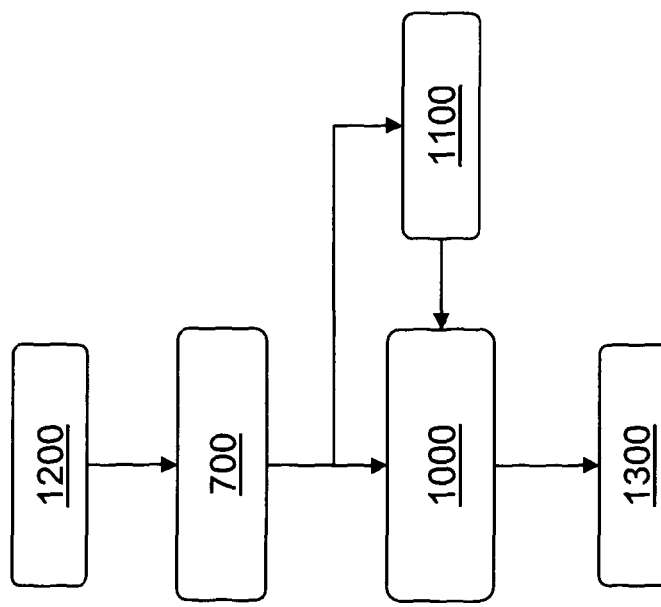
FIG. 25 shows a flow diagram of correcting data for speed variation and offset between datasets.

FIG. 25 shows a simplified flow for correcting data 1200 from a measurement device 900 (e.g. having two or more sensors offset in the direction of travel)—i.e. raw data. Data is initially passed to the apparatus 700 for correcting data for speed variation (cf. FIG. 11), and subsequently is passed to the apparatus 1000 for correcting data using determined features associated with the data (e.g. for offset correction) (cf. FIG. 25). Statistical data is derived by the statistical analyser 1100 from the speed corrected data for use as keyframes. The resultant output of the process of FIG. 25 is corrected data 1300 that has been corrected for unwanted speed variations as well as for the offset provided between sensors. It will be appreciated that the data need not be split and combined between steps.

In some cases, data may already have been corrected in some manner (e.g. speed variations and/or offset). In the example of a logging tool, unwanted speed variations may have been corrected for by using information provided by accelerometers. However, as discussed, such information can be inaccurate. Data may also have been corrected for the offset (e.g. by crudely moving one dataset with respect to another). In such cases, it may be helpful to uncorrect that data using the above described methods in order to improve the accuracy.

Figure 26:
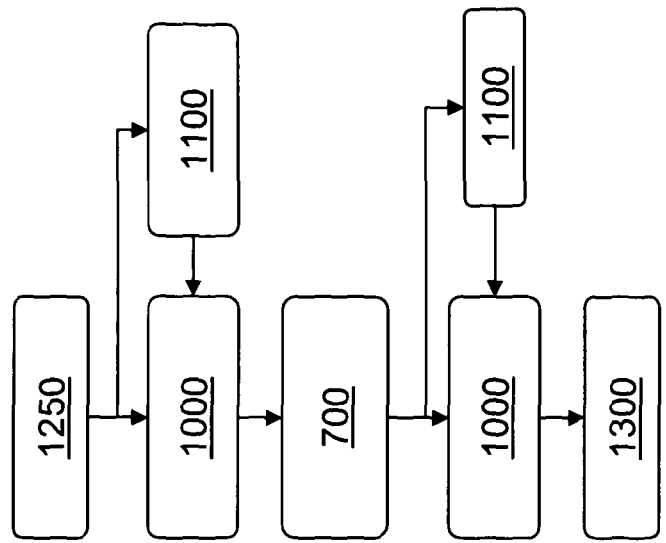
FIG. 26 shows a flow diagram of correcting data, which has already been corrected, the flow diagram showing correction for speed variation and offset between datasets.

Consider now FIG. 26, which shows a simplified flow for correcting pre-corrected data 1250 which in this case is for correcting data which has already undergone some form of correction for offset between sensors (and potentially speed correction also—e.g. using information from accelerometers). In this example, the pre-corrected data is passed to apparatus 1000 for correcting using determined features associated with the data. Of course, while in the above examples, the apparatus 1000 of FIG. 23 has been configured to determine features associated with the data, and align, or bring these features back into registration, so as to correct for an offset, it will be appreciated that the same apparatus 1000 can be used to bring other features of the data into alignments, or registration.

Consider now that data from a measurement device (e.g. 900) may have unwanted speed variations, which result in anisotropies associated with that speed variation. For one dataset to be isochronous with another, then these speed variations, or anisotropies, must be apparent at the same or similar time, in all datasets. Therefore, where previous offset correction has occurred, it is possible to remove that offset correction by correlating anisotropies that are as a result of speed variation, and using those anisotropies to align the datasets (e.g. using the anisotropies to detect keyframes), thus bringing those speed-varying anisotropies back into registration. A determined anisotropy that is as a result of speed variation is more apparent and therefore distinguishable from an anisotropy that is as a result of an underlying artefact or feature.

After the data has been corrected to remove a previous offset correction, the data can subsequently be corrected for speed and offset, in a similar manner to FIG. 25.

Figure 27:
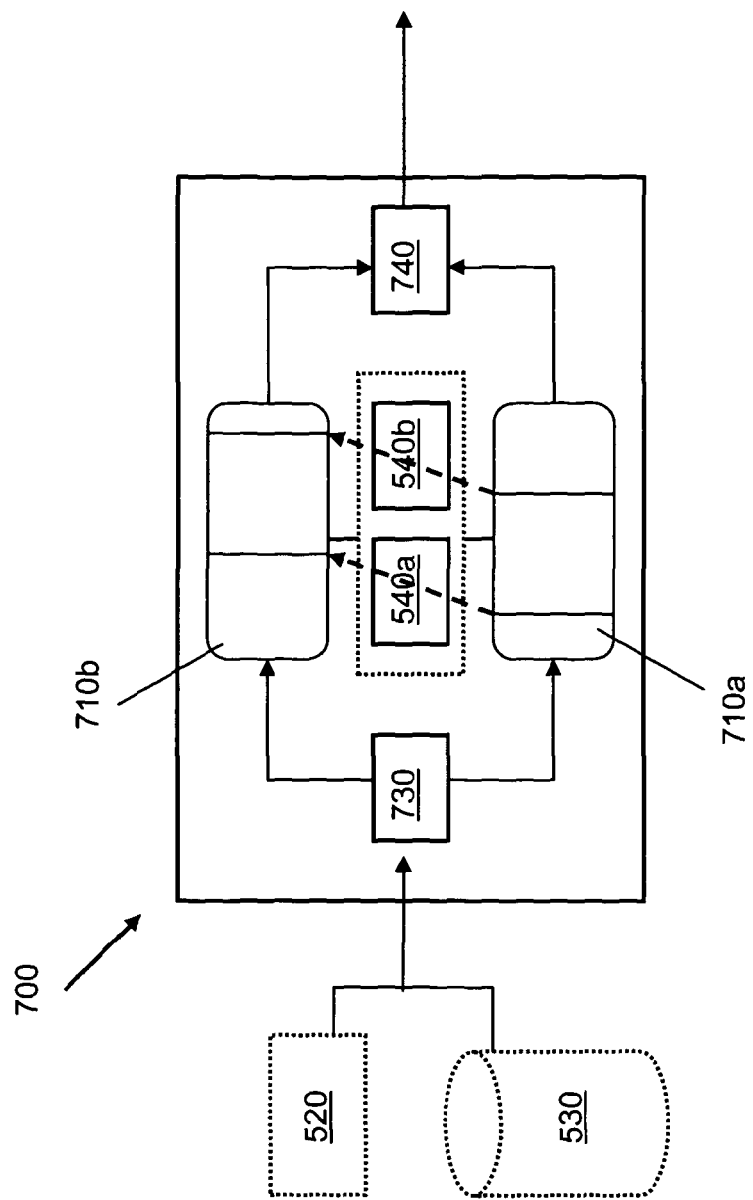
FIG. 27 shows an alternative embodiment of the apparatus of FIG. 11, but for correcting data, which has already been corrected.
Figure 28:
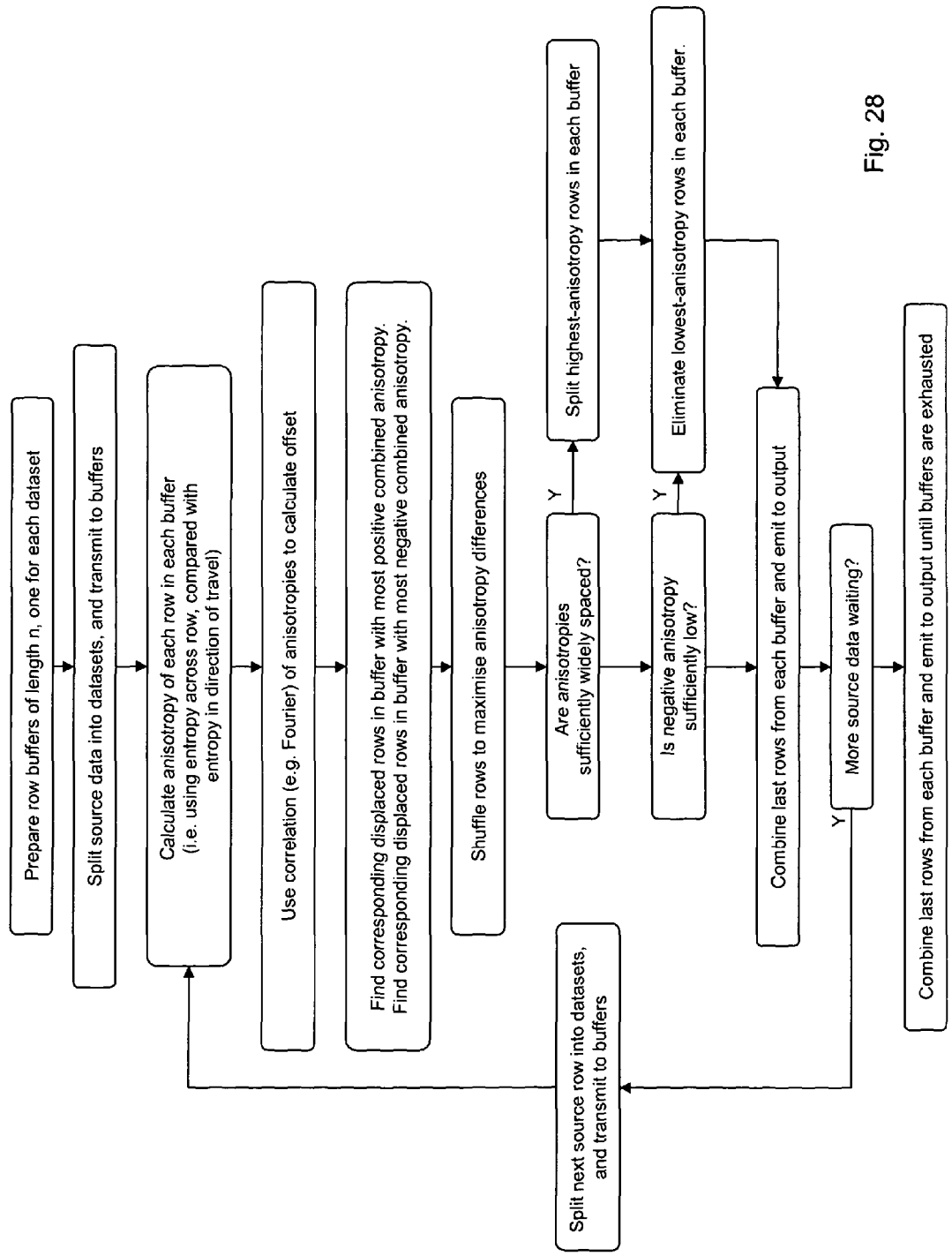
FIG. 28 shows a flow diagram of exemplary steps taken by the apparatus of FIG. 27.

Of course, in this example, the correction for previously corrected offset occurs prior to the speed correction. However, in further embodiments, that need not be the case. Consider now FIG. 27 which shows an alternative embodiment of the apparatus 700 of FIG. 11. The apparatus is configured to operate using the steps of FIG. 28.

In this example, the apparatus 700 is configured to determine the associated anisotropies associated with each row. However, rather than determining corresponding positive/negative anisotropy observed in one buffer 710a and the other another buffer 710b at the same, or similar row (or time), the apparatus 700 is configured to correlate (e.g. using Fourier correlation, for example using the statistical analyser 1100) corresponding positive/negative anisotropy across the each buffer, which allows for speed variations to be observed and corrected when the corresponding anisotropies are offset due to previous offset correction, as will be appreciated.

In some cases, the anisotropies of datasets are correlated in buffers containing the anisotropy estimates. It such cases, it is the correlation of the contents of these additional buffers that are used to determine the displacement, or offset. Such cases may be considered to provide projective form of apparatus, or filter.

Nevertheless, while the anisotropies are of row can be correlated, it will be appreciated that as particular rows get morphed, every morph changes the anisotropy of the affected rows (such that the output anisotropy is levelled out). Therefore, it is also possible to correlate that changing anisotropy. In such examples, this progressively reduces low anisotropies, even if there are more of them than will fit into the buffers. Furthermore, when combined with the option of deleting rows without necessarily adding rows elsewhere, jams of (apparently) many hundreds of feet can be eliminated. Such a configuration may additionally provide a better result when the anisotropies are fluctuating widely. This may be considered to be recursive form of apparatus, or filter.

Therefore, the above described method and apparatus allow for correction of data for unwanted speed variation, and for offset, whether on raw or corrected data. It will be appreciated that the ability to accurately locate artefacts, such as those measured by logging tools, is particularly beneficial in the exploration for hydrocarbon bearing formations.

Although it has been helpful to describe the above apparatus and methodology in respect of two sensors it will readily be appreciated that the invention is not so limiting, and that the same principles apply to correcting data derived from more than two sensors 600. For example, logging tools may have more than two sensors. In addition, such sensors may have any number of pads (e.g. four, five, ten, etc). In addition to that, pad or sensor may comprise any number of sensor elements.

While in the above examples, it has been helpful to describe the correlation of datasets from two sensors (e.g. FIG. 10, FIG. 15, etc.), it will be appreciated that the in some cases, where more than two sensors are provided, that there may be alternative ways in which to correlate particular features in those datasets to provide keyframes.

Figure 29:
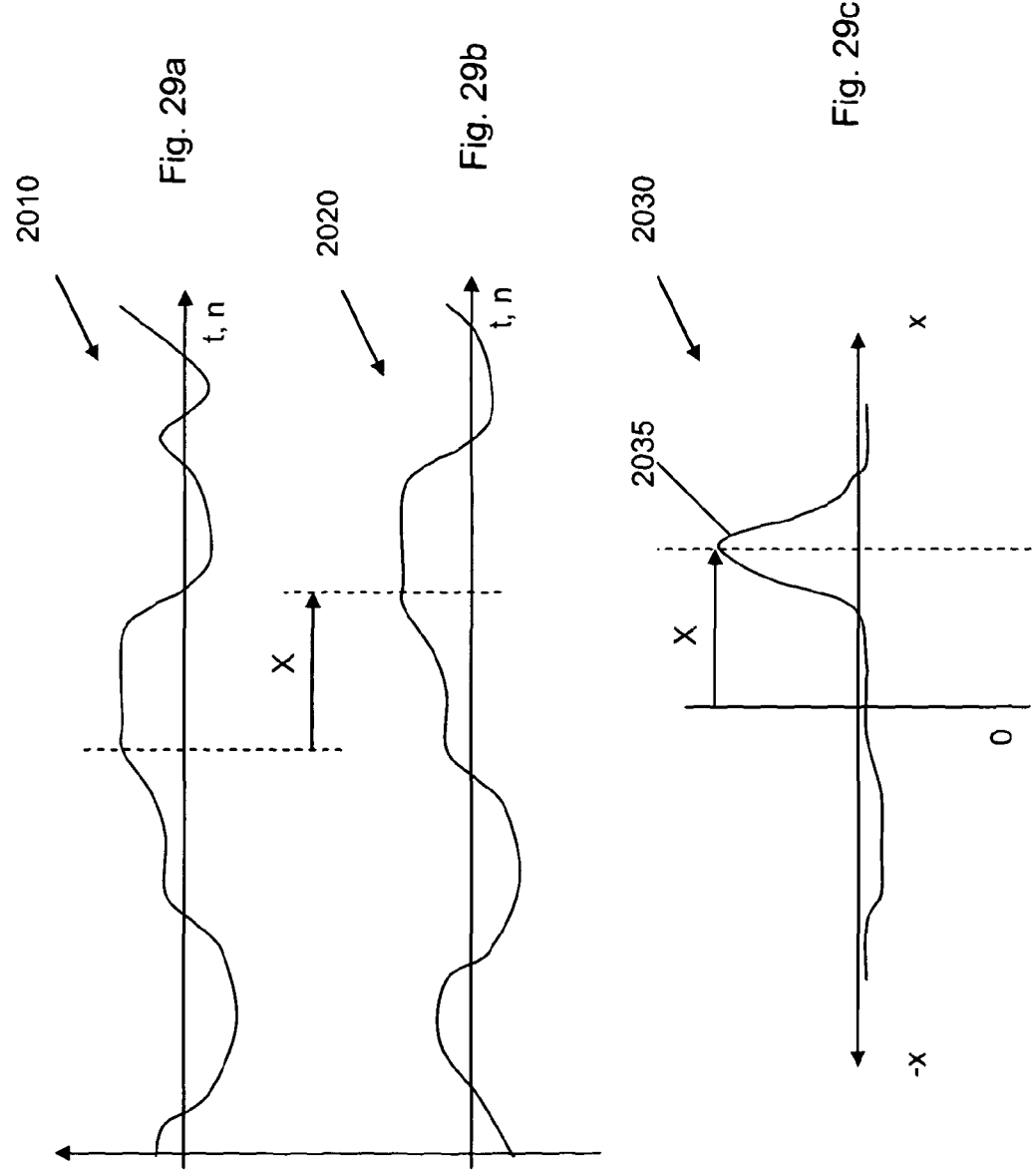
FIG. 29 shows exemplary signals, and an associated correlation.

By way of a reminder, FIG. 29 shows two exemplary signals 2010, 2020 (e.g. signals associated with data integrals, anisotropies, etc.) provided from two datasets, as would occur when using two sensors. The signals 2010, 2020 vary over the number of rows, n, or time, t, which are interrelated.

FIG. 29c shows a correlation signal 2030, or correlogram, from the two signals 2010, 2020, whereby a peak 2035 is shown at a particular offset, X, which may relate to the offset shown in FIG. 10 for example. As described, using peak detect methods, the peak 2035 can be discriminated, and the offset can be determined. In this case, if the offset is X, this may mean that the first dataset can be moved temporally backwards by X/2, while the second dataset can be moved forwards by X/2 in order bring the datasets into alignment.

Figure 30:
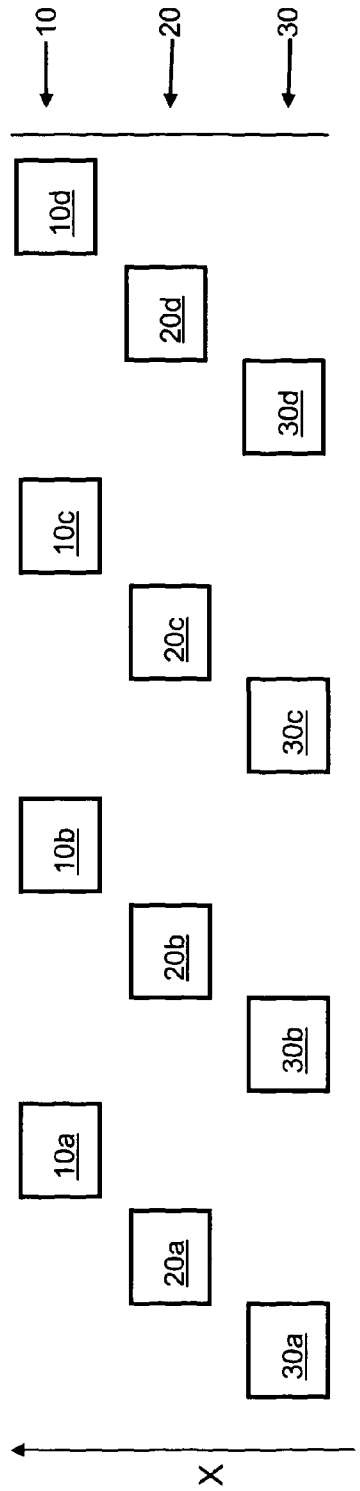
FIG. 30 shows a further exemplary configuration of a measurement device, in a similar manner to FIG. 18b.

Consider now FIG. 30, which is similar to FIG. 18, but having three sensors 10, 20, 30—first, 10, second, 20 and third 30 sensors. In this case, each sensor 10, 20, comprises four pads 10a-10d, 20a-20d, 30a-30d, which may be circumferentially spaced in the example of a logging tool. The sensors 10, 20, 30 are configured so as to be able to measure, or characterise a borehole, being pulled in the direction 'X'. The datasets from each sensor can be considered to be ordered in that, broadly speaking, artefacts in the material being measured will be apparent to the first sensor 10, then the second sensor 20, and then the third sensor 30. As such, any correlation will always show an offset in the same direction (see FIG. 29c). However, within each sensor, artefacts may not be apparent to each pad in order (e.g. the artefacts may be apparent on 10c, then 10d, then 10a, then 10b—cf. FIG. 20).

In order to correlate datasets to provide an offset between the first sensor 10, and the second sensor 20, the above methodology can be used. Similarly, it is possible to subsequently determine the offset between the second sensor 20, and the third sensor 30 in a similar manner.

Figure 31:
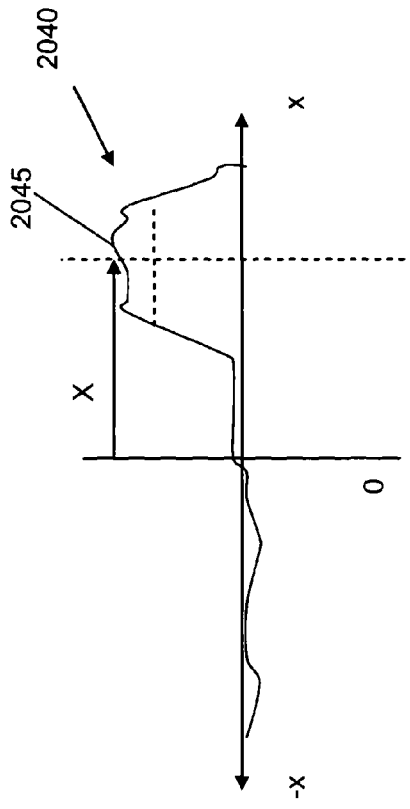
FIG. 31 shows a correlation having an ill-defined, but discriminated peak.

However, in some cases, it will be appreciated that when the peak correlation is discriminated, i.e. a peak is indentified, it may be that that offset comprises some error—e.g. when the peak is not definite, or is ill-defined. FIG. 31 shows an example of a correlation signal 2040 in which the peak correlation 2045 might be considered to be ill-defined. As such, a particular offset is discriminated, but because of the ill-defined peak, this discrimination may result in some error. Of course, in the example of two sensors, this may be negligible. However, when correlating from more than two sensors, this may compound errors, and become apparent.

One way in which to determine whether the discriminated peaks are accurate is to correlate, or determine, the offset between first and second sensors, and then between second and third sensors, and then between first and third sensor. In such a case, the offset between first and third sensors should be associated with the cumulative offset determined between first and second, and second and third.

However, consider now FIG. 32a to FIG. 32e. FIG. 32a shows an exemplary correlation 2100 between datasets from first and second sensors 10, 20. As can be seen, the correlation suggests a strong indication at an offset 2110, and a weaker correlation at a second offset 2015. In this case, the offset is determined (or discriminated) to be at the stronger correlation offset 2010. FIG. 32b shows a similar correlation 2200 for the offset between second sensor 20, and third sensor 30. In this example, it is apparent that the offset between the second sensor and the third sensor is greater than the offset between the first and second sensor, but of course, this is exemplary only. FIG. 32b shows an ill-defined peak 2210, and therefore, there may be some error in the offset due to the discrimination process.

However, in this example, the convolution 2300 of the correlation in FIG. 32a and FIG. 32b can be used, as shown in FIG. 32c. In this case, the offsets may be considered difficult to determine without some degree of error. FIG. 32d shows a correlation 2400 between first and third sensors 10, 30, which again shows an ill-defined peak 2410. However, in this example, the correlation of the FIG. 32c can be used (e.g. multiplied) with correlation of FIG. 32d to provide a better indication as to the offset between the first and third sensors, as exemplified in FIG. 32e, which shows a well defined peak 2510. The offset, shown in FIG. 32e, can then be used to determine which peaks in FIGS. 32a and 32b show the offset between first and second sensors 10, 20, and second and third sensors 20, 30. In other words, the cumulative offsets determined in FIG. 32e can be used repercussively to determine the correct peaks in FIGS. 32a and 32b.

In a similar manner, when the considering correlating between the pads 10a-10d, 20a-20d, 30a-30d in order to determine a core data integral, or the tilt of a particular striation, for example, the artefacts may not be present themselves in an ordered manner as described above. However, by taking using opposing pads (e.g. 10a, 10c), it will be apparent that any tilting artefact will be apparent to one of these pads (e.g. 10a) first, and then the opposing pads (e.g. 10c)—cf. FIG. 19, which may appear in an ordered manner.

Therefore, it is possible to determine the offset for opposing pads such that all the offsets correspond. It is helpful to assume that the cumulative offsets from all opposing pads on a sensor, measuring a tilting artefact, sum to a zero offset (cf. FIG. 21a or 21b, for example). This can be done for each sensor 10, 20, 30. In the example in which an odd numbers of datasets, or pads, are provided then, of course, it is possible to assume that certain pads are in opposition, and to weight the results.

As an alternative to the above, it is possible to determine a consensus, much like in the example when the cumulative sum of the offset between first and second, second and third offsets with a determined offset between first and third sensor. Where there are n datasets, Ci, where i is in 1 . . . n, then in some cases, every Ci has an associated displacement Di (i.e. a displacement to be determined). However, all the manner in which the displacements are determined is by using the associated correlations. In other words, Di−Dj=corr (Ci, Cj).

Therefore, if each dataset is correlated with every other dataset, and then discriminated to find the displacement difference for each pair, the result is a series of linear equations, which is obviously overdetermined. As above, by providing the constraint that the sum of the displacement is associated with a parameter (e.g. $\Sigma(D_i)=0$), then it is possible to solve the linear equations using least squares.

However, in a similar manner as before as exemplified in FIG. 32 it is possible to combine the correlations, rather or in addition to, the discriminated offsets.

Consider n datasets Ci, where i is in 1 . . . n. Consider two of those (e.g. i, and j). There will be an associated correlation between Ci and Cj, which is determinable. However, this is also a correlation between them that is the convolution of all the correlations in a particular direction from i to j (e.g. i, i+1, j−1, j)—there is of course another correlation in the opposite direction. By comparing those convolved correlations with the direct one it is possible to refine the direct one.

The correlations of pads on a number of sensors can be achieved in the same manner as above by using simultaneous equations, but this time not based on linear combinations of numbers but on convolutions and multiplications of correlations. Again, because of the interrelationships, the simultaneous system is overdetermined. Based on the above discussion, a skilled reader will be able to implement various forms in which datasets from two or more sensors or pads can be correlated.

While the methods and apparatus have been described in relation to geological logging data, it will be appreciated that the same principles can be employed with any scanned data. Examples include document scanning (where paper jams and crumples can be corrected), laser-scanning rangefinders (where tool instabilities and progressive tool motion can be corrected), scanning photography such as panoramas or satellite scans (where relative object motions can be corrected), photofinish images and high-speed cinematography (where film rumble can be corrected), mechanical sound reproduction (where transport wow and flutter and tape stretch can be corrected even without an underlying bias tone), and measurement in continuous-flow industrial processes (where variations in product flow and tool vibration can be corrected).

It will be appreciated that any of the aforementioned apparatus may have other functions in addition to the mentioned functions, and that these functions may be performed by the same apparatus. In addition, it will be appreciated that the above described apparatus may be provided on hardware, firmware, software or combination thereof. In certain embodiments, the apparatus may be provided on a Field Programmable Gate Array, Application Specific Integrated Circuit, or the like, which may be provided with a device or sensor. If any of the above apparatus is provided with a device, then data provided from that device may be corrected prior to receipt by a user.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. For example, while some of the above embodiments have been described with respect to using determined entropy (rather than noise characteristics), it will be appreciated that in further embodiments, the methods and apparatus may use the determined variation in noise characteristics. The applicant indicates that aspects of the invention may consist of any such individual feature or combination of features. In view of the foregoing description it will be evident to a person skilled in the art that various modifications may be made within the scope of the invention.

The invention claimed is:

1. A method for providing for correcting data from a sensor for changes in relative speed of the sensor when being moved with respect to a material being measured, the method comprising:
using a determined entropy from data associated with across a direction of travel of the sensor together with a determined entropy from data associated with in a direction of travel of the sensor, the determined entropies allowing for providing for correcting the data for changes in the relative speed of the sensor.

2. The method according to claim 1, wherein the method comprises comparing the determined entropies, or the variation in determined entropies from one sample interval to a subsequent sample interval, to allow for providing for correcting the data for changes in the relative speed of the sensor.

3. The method according to claim 1 comprising determining the entropy from data associated with across a direction of travel of the sensor by using data provided from two or more sensor elements of the sensor, the two or more sensor elements being configured across the direction of travel.

4. The method according to claim 1 comprising determining the entropy from data associated with in the direction of travel of the sensor by using data provided from a particular sensor element of the sensor, with data from a corresponding sensor element, such as the same sensor element, but at a different sample interval.

5. The method according to claim 4, wherein data from particular sensor elements is usable to reconstruct a pixel for an image.

6. The method according to claim 1, comprising determining an anisotropy by comparing determined entropies to be different, the determined anisotropy usable to allow for providing for correcting the data.

7. The method according to claim 6, wherein the determined anisotropy is indicative of the variation of speed of the sensor.

8. The method according to claim 6, comprising determining an increase in relative speed of the sensor and a corresponding decrease in relative speed of the sensor by determining corresponding increases and decreases in determined anisotropies, in order to allow for correcting of the data for the increase and corresponding decrease in relative speed.

9. The method according to claim 8 comprising determining the corresponding increase and decrease in relative speed by comparing, with a threshold, the relative difference between corresponding determined anisotropies.

10. The method according to claim 1, wherein the method is for correcting data from a logging tool.

11. A computer program, provided on a non-transitory computer readable medium, the computer program configured to provide the method of claim 1.

12. Apparatus for providing for correcting data from a sensor for changes in relative speed of a sensor when being moved with respect to a material being measured, the apparatus configured to use a determined entropy from data associated with across a direction of travel of a sensor together with a determined entropy from data associated with in a direction a travel of a sensor, the determined entropies allowing for providing for correcting the data for changes in the relative speed of the sensor.

13. One or more measurement devices comprising one or more apparatus according to claim 12.

14. The measurement device(s) according to claim 13 comprised with a logging tool.

15. A method for providing for correcting data from a measurement device comprising datasets from at least first and second sensors, such sensors being offset along the intended direction of travel of the measurement device, the method comprising:
    comparing determined anisotropies in a first dataset associated with the first sensor with determined anisotropies in a second dataset associated with the second sensor, each determined anisotropy being associated with a determined entropy from data associated with across a direction of travel of a respective sensor together with a determined entropy from data associated with in a direction a travel of the respective sensor; and
    using the compared anisotropies to allow for correcting the data from the measurement device.

16. The method according to claim 15 comprising providing for correcting the data in each dataset for speed variations when compared anisotropies associated with particular rows of data in the first and second datasets are determined to be similar or the same, or the variation of anisotropy is determined to be similar or the same, at, or around, the same time, such a row of data corresponding to data of a particular sample interval in each dataset associated with across a direction of travel.

17. The method according to claim 15, wherein the compared anisotropies are used to allow for correcting the data for the offset between the first and second sensor when a compared variation of anisotropy in first and second datasets is determined to be similar, or the same, but at different times.

18. The method according to claim 15, comprising using the compared anisotropies to allow for correcting the data from the measurement device, wherein the data has been previously corrected for the offset between first and second sensor, and wherein the method comprises re-correcting the data such that particular determined anisotropy occur at the same, or similar time.

* * * * *